May 17, 1966 A. JAZBUTIS 3,251,142

SIMULATOR

Filed May 21, 1962 21 Sheets-Sheet 1

INVENTOR
ANATOLIJUS JAZBUTIS

BY Strauch, Nolan & Neale
ATTORNEYS

INVENTOR
ANATOLIJUS JAZBUTIS
BY Strauch, Nolan & Neale
ATTORNEYS

INVENTOR
ANATOLIJUS JAZBUTIS
BY Strauch, Nolan & Neale
ATTORNEYS

May 17, 1966

A. JAZBUTIS 3,251,142

SIMULATOR

Filed May 21, 1962

21 Sheets-Sheet 4

INVENTOR
ANATOLIJUS JAZBUTIS

BY Strauch, Nolan & Neale
ATTORNEYS

INVENTOR
ANATOLIJUS JAZBUTIS
BY Strauch, Nolan & Neale
ATTORNEYS

May 17, 1966 A. JAZBUTIS 3,251,142

SIMULATOR

Filed May 21, 1962 21 Sheets-Sheet 6

INVENTOR

ANATOLIJUS JAZBUTIS

BY Strauch, Nolan & Neale

ATTORNEYS

May 17, 1966 A. JAZBUTIS 3,251,142

SIMULATOR

Filed May 21, 1962 21 Sheets-Sheet 7

INVENTOR

ANATOLIJUS JAZBUTIS

BY Strauch, Nolan & Neale

ATTORNEYS

May 17, 1966 A. JAZBUTIS 3,251,142

SIMULATOR

Filed May 21, 1962 21 Sheets-Sheet 8

INVENTOR

ANATOLIJUS JAZBUTIS

BY Strauch, Nolan & Neale

ATTORNEYS

| K-6 | K-7 | K-8 | FUNCTION |
|---|---|---|---|
| 0 | 0 | 0 | |
| 1 | 0 | 0 | RECORDER SPEED INCREASES |
| 1 | 1 | 0 | POWER TO S16 COIL |
| 0 | 1 | 0 | POWER REMOVED FROM S-16 COIL, S-16 ADVANCES, ENERGIZING POWER TO K-5 AVAILABLE |
| 0 | 1 | 1 | LOCKING POWER TO K-5 AVAILABLE |
| 1 | 1 | 1 | ENERGIZING POWER FOR K-5 REMOVED |
| 1 | 0 | 1 | STARBURST POWER AT K-5a AVAILABLE |
| 0 | 0 | 1 | RECORDER SPEED DECREASED |
| 0 | 0 | 0 | TEST CYCLE RESET |

NOTE
"1" DENOTES ENERGIZED RELAY
"0" DENOTES DE-ENERGIZED RELAY

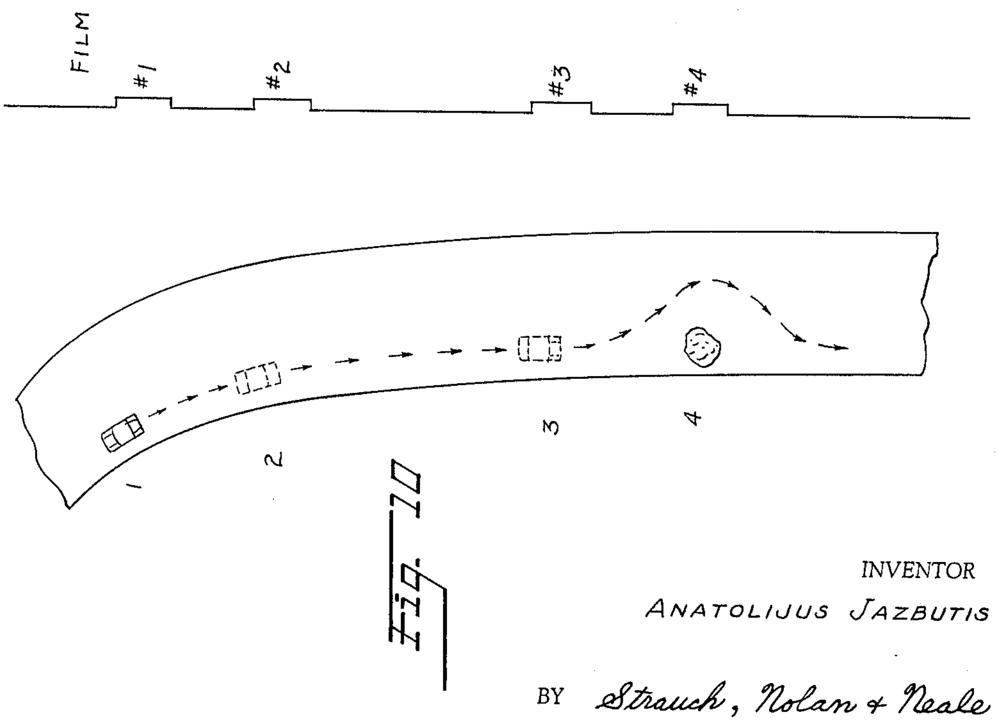

FIG. 10

INVENTOR
ANATOLIJUS JAZBUTIS
BY Strauch, Nolan & Neale
ATTORNEYS

INVENTOR
ANATOLIJUS JAZBUTIS

BY Strauch, Nolan + Neale
ATTORNEYS

May 17, 1966 A. JAZBUTIS 3,251,142

SIMULATOR

Filed May 21, 1962 21 Sheets-Sheet 11

INVENTOR

ANATOLIJUS JAZBUTIS

BY Strauch, Nolan & Neale

ATTORNEYS

May 17, 1966 A. JAZBUTIS 3,251,142

SIMULATOR

Filed May 21, 1962 21 Sheets-Sheet 12

INVENTOR
ANATOLIJUS JAZBUTIS

BY Strauch, Nolan & Neale

ATTORNEYS

INVENTOR
ANATOLIJUS JAZBUTIS

BY Strauch, Nolan & Neale
ATTORNEYS

SIMULATOR

Filed May 21, 1962

INVENTOR
ANATOLIJUS JAZBUTIS
BY
Strauch, Nolan & Neale
ATTORNEYS

May 17, 1966 A. JAZBUTIS 3,251,142

SIMULATOR

Filed May 21, 1962 21 Sheets-Sheet 15

INVENTOR
ANATOLIJUS JAZBUTIS

Strauch, Nolan + Neale
ATTORNEYS

INVENTOR
ANATOLIJUS JAZBUTIS
BY Strauch, Nolan & Neale
ATTORNEYS

May 17, 1966 A. JAZBUTIS 3,251,142

SIMULATOR

Filed May 21, 1962 21 Sheets-Sheet 17

INVENTOR

ANATOLIJUS JAZBUTIS

BY Strauch, Nolan & Neale

ATTORNEYS

May 17, 1966 A. JAZBUTIS 3,251,142

SIMULATOR

Filed May 21, 1962 21 Sheets-Sheet 18

INVENTOR

ANATOLIJUS JAZBUTIS

BY Strauch, Nolan & Neale

ATTORNEYS

INVENTOR
ANATOLIJUS JAZBUTIS
BY Strauch, Nolan & Neale
ATTORNEYS

INVENTOR
*ANATOLIJUS JAZBUTIS*

*Strauch, Nolan & Neale*
ATTORNEYS

INVENTOR
ANATOLIJUS JAZBUTIS
BY Strauch, Nolan & Neale
ATTORNEYS

United States Patent Office 3,251,142
Patented May 17, 1966

3,251,142
SIMULATOR

Anatolijus Jazbutis, Jamestown, N.Y., assignor, by mesne assignments, to Aetna Casualty and Surety Company, a corporation of Connecticut Filed May 21, 1962, Ser. No. 196,290
21 Claims. (Cl. 35—11)

The present invention relates to dirigible vehicle simulators and, more particularly, to devices for evaluating, under simulated conditions, the driving ability of an automotive vehicle operator.

Devices of the type to which the present invention relates are useful in evaluating the skills and attitudes of drivers, license applicants and prospective employees for positions requiring driving ability. For these purposes, particularly the latter where one is attempting to evaluate the efficiency and attitude of an accomplished driver, it is important to give the person under evaluation as much of a feeling of realism as is practical while maintaining the expense of the equipment acceptably low.

For this purpose the present invention provides driver evaluating apparatus in which a simulated vehicle is positioned in front of a relatively wide, curved screen upon which is projected a varying scene depicting a typical sequence of events encountered while driving. The simulated vehicle is mounted for pivotal motion with respect to the screen in response to steering action by the driver and the rate of presentation of the scene is normally varied in response to actuation of the accelerator pedal by the operator.

Driving safety is a function of three main factors: (1) knowledge of automobile operating mechanics; (2) human physical limitations; and (3) the driver's attitude on the road.

Automobile operating mechanics can be taught and tested on presently available driver training equipment such as that disclosed in United States Patent 2,870,548 issued Jan. 27, 1959, to C. Chedister for "Driver Training and Testing Equipment." The human physical dexterity required to perceive and react in a sufficiently short time to given incidents can be tested by the apparatus shown in United States Patent No. 2,273,091, issued Feb. 17, 1942, to H. R. De Silva for "Apparatus for Ascertaining a Subject's Behavior When Operating a Motor Vehicle."

A driver's road attitude, however, is one of the most difficult parameters to measure. The closest approach of the prior art to the solution of this problem is the apparatus disclosed in United States Patent No. 2,715,783 issued Aug. 23, 1955, to C. Chedister et al. for "Testing and Training Mechanism" which, however, is not entirely satisfactory in certain respects as will be pointed out in the ensuing paragraphs.

In order to properly evaluate a driver's road attitude, he must be subjected to simulated unusual road conditions which will induce him to behave as he normally would on an actual road under similar conditions. To accomplish this, special films have been developed to present road situations in response to which the driver is forced to make snap decisions to meet road requirements and to avoid propelling himself into unsafe situations. Simultaneously, anticipation of certain road conditions can be induced by giving the driver advanced hints of what to expect on the road ahead, enabling him, if alert, to take appropriate corrective action and avoid hazardous situations. For example, one scene may portray an aproaching car turning unexpectedly across the path of the driver of the simulated vehicle; a second, a car unexpectedly stopping abruptly in front of the driver; a third, an unexpected construction road-block; a fourth, a changing of an intersection traffic control signal light from green to amber and to red; and a fifth, a parked car unexpectedly pulling out in front of the driver.

Assuming that the films provided present the driver with prescribed stimuli which will provoke reactions by him which are indicative of his attitude, the other equipment must be able to accurately measure the reactions. It is important, in this respect, to enhance as much as possible the driver's sensation of actual driving since, if the driver retains a strong feeling throughout the test that he is in an artificial situation, his reactions will be totally unlike those produced under actual circumstances. One important factor in increasing this feeling of realism is giving the driver a feeling of steering. In the Chedister et al. Patent No. 2,715,783 this was achieved to a limited extent by moving the projected scene laterally in response to steering action of the driver.

In contrast, the car or vehicle used in the equipment of the present invention is equipped with some actual steering capacity so that the car itself is moved in response to steering action rather than the projected scene. The car can be steered to the left or to the right approximately 15° from the neutral line, giving the driver a forceful sensation of positioning himself on the road which is projected upon the screen in front of him. To provide the driver with a sensation of speed and thereby further increase the feeling of realism, the projector speed is controlled within certain limits by accelerator pedal depressions. And, in order to detect and evaluate the driver's reaction to each given situation, his actions are recorded on a strip chart recorder on a continuous basis. The parameters recorded by the apparatus of the present invention are as follows:

(1) The speed at which the simulated car is driven;
(2) The driver's steering actions;
(3) Actuation of the brake pedal;
(4) Failure to take required action in time to avoid a dangerous situation;
(5) Left directional signal actuation;
(6) Right directional signal actuation; and
(7) Event or reference markers.

In the past it has been found that some of the drivers under test tend to follow the camera car used in making the film. If the camera car is always driven in the correct manner, as was contemplated in the apparatus of the aforesaid Chedister Patent No. 2,715,783, such a driver will have a higher score than that to which he is actually entitled. In order to prevent this and thereby provide more accurate scoring, the camera car will not always drive in the correct manner. The testee will be warned ahead of time about this to encourage him to follow the road depicted on the screen rather than the camera car.

For example, in portraying a scene in which the simulated car rounds a curve in the road and comes upon a roadblock in the car's lane, the camera car will be driven directly toward the roadblock as if it didn't exist. Therefore, if the driver under test fails to take the proper action to avoid the roadblock, he will be continuously visually presented with the results of his failure to do so. Any driver who tends to follow the action of the camera car will thus take incorrect action rather than automatically taking the proper action as he would tend to do in the prior devices.

Where the driver is driving correctly but in the projected scene is shown as driving incorrectly a frustrated feeling may arise in the driver which will decrease his driving efficiency and result in an inaccurate test result and unfairly low test score. Frustration is avoided in the present invention by a test sensing circuit which will recognize the correct action of the driver and extinguish the projector lamp, thereby leaving the screen blank for a short moment during which the terminal portion of the sequence showing the results of improper action is being displayed. This normally will be followed by a new sequence on the film with projector light restored. On the other hand, if the driver fails to take timely corrective action, the sequence is completed by flooding the screen with vivid red light. This display, which will be referred to hereinafter as a "starburst," has been found to produce very vivid and lasting impressions upon the driver.

In the prior art devices, the rate of feed of the strip chart employed to record the driver's actions past the recording instrumentalities has either been constant or directly proportional to film speed. This produces either extremely long records which are inconvenient to score and store or records which are practically impossible to interpret because of low resolution. In the present invention the strip chart length is greatly reduced while retaining ease of interpretation by varying the speed of strip chart paper drive. For an uneventful stretch of road, the strip chart paper is driven at slow speed. When a critical test situation is presented, the strip chart speed is automatically increased to expand the scale upon which the record is made, thereby providing improved resolution for better interpretation of the driver's performance.

Under certain circumstances, it is desirable to stop the projector for intervals of varying duration and then resume operation of the projector to complete a test without loss of recording continuity. For example, if the driver undergoing the test causes an accident by failing to take timely corrective action upon being presented with an unusual road condition, the instructor may desire to interrupt the test and immediately instruct the driver in the proper course of action to better impress it upon his memory. For this purpose, the present invention provides a novel hold switch which can be operated by the instructor to stop the projector for an interval of such duration as he may desire and then resume testing without loss of recording continuity and without requiring that the test be started over.

As was discussed above, the present invention provides driver evaluating apparatus including a simulated vehicle equipped with conventional controls and a projector for displaying a road scene at a rate which is normally varied in response to actuation of vehicle accelerator pedal by the operator. In addition, the present invention provides novel circuitry for by-passing accelerator control of the projector speed and operating the projector at a constant speed. This by-pass circuit may be energized by the instructor and may be advantageously employed during the introductory portion of the test to explain the test and impart other information to the driver being tested.

The objects of the present invention include:

(1) The provision of improved equipment for evaluating the driving ability of an automotive vehicle operator, especially his attitude on the road;

(2) The provision of improved driver evaluating equipment which will impart to the driver being tested a greater feeling of realism than the prior art devices without raising the cost of the equipment to an unacceptable level;

(3) In conjunction with the foregoing object, the provision of improved driver evaluating equipment wherein a more realistic response to steering wheel manipulation is provided;

(4) The provision of improved driver evaluating apparatus employing a filmed road scene in which the possibility that a driver undergoing test will raise his score to an unnaturally high level by following the path of the camera car is avoided;

(5) The provision of driver evaluating apparatus with improved means for impressing the driver undergoing test with the consequences of his failure to take corrective action when presented with an unusual or potentially hazardous situation;

(6) The provision of improved driver evaluating apparatus which will avoid the driver frustration engendered by showing the driver the results of an improper response when he has responded correctly to a test situation;

(7) The provision of driver evaluating equipment including improved means for furnishing a continuous strip chart record of a driving test which is less bulky than the record provided by the prior art equipment but which has the resolution necessary to enable an accurate evaluation of the test driver's performance;

(8) The provision of improved driver evaluating equipment which will permit the instructor to temporarily interrupt and subsequently resume a test without loss of recording continuity and without the necessity of starting the test over; and (9) The provision of driver evaluating equipment having a simulated automotive vehicle equipped with conventional controls and a projector adapted to project a road scene at a speed proportional to accelerator depression and including novel means for by-passing accelerator control and operating the projector at a constant speed during the initial or other portion of a test to describe the test to or impart other information to the driver being tested.

Other objects and further novel features of the present invention will become fully apparent from the appended claims and the ensuing detailed description and discussion taken in conjunction with the accompanying drawings, in which:

FIGURE 10 is a diagram illustrating the correlation between the simulated vehicle motion, the notches on the film employed to present a varying road scene to the operator of the simulator, and the electrical circuit operation for a typical test incident in response to which the driver being tested has taken proper corrective action;

Figure 1:
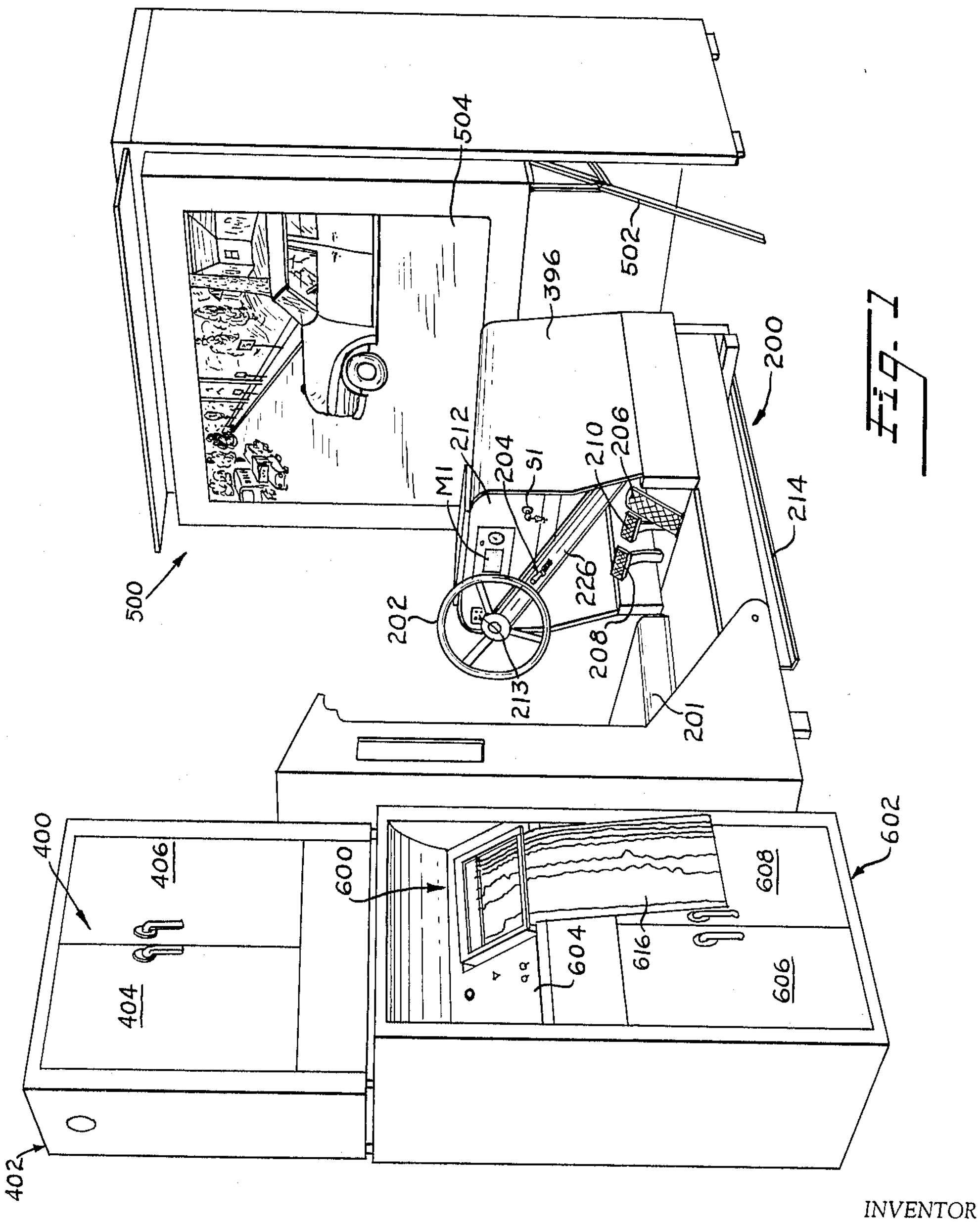
FIGURE 1 is a perspective view of the complete simulator of the present invention.
Figure 11A:
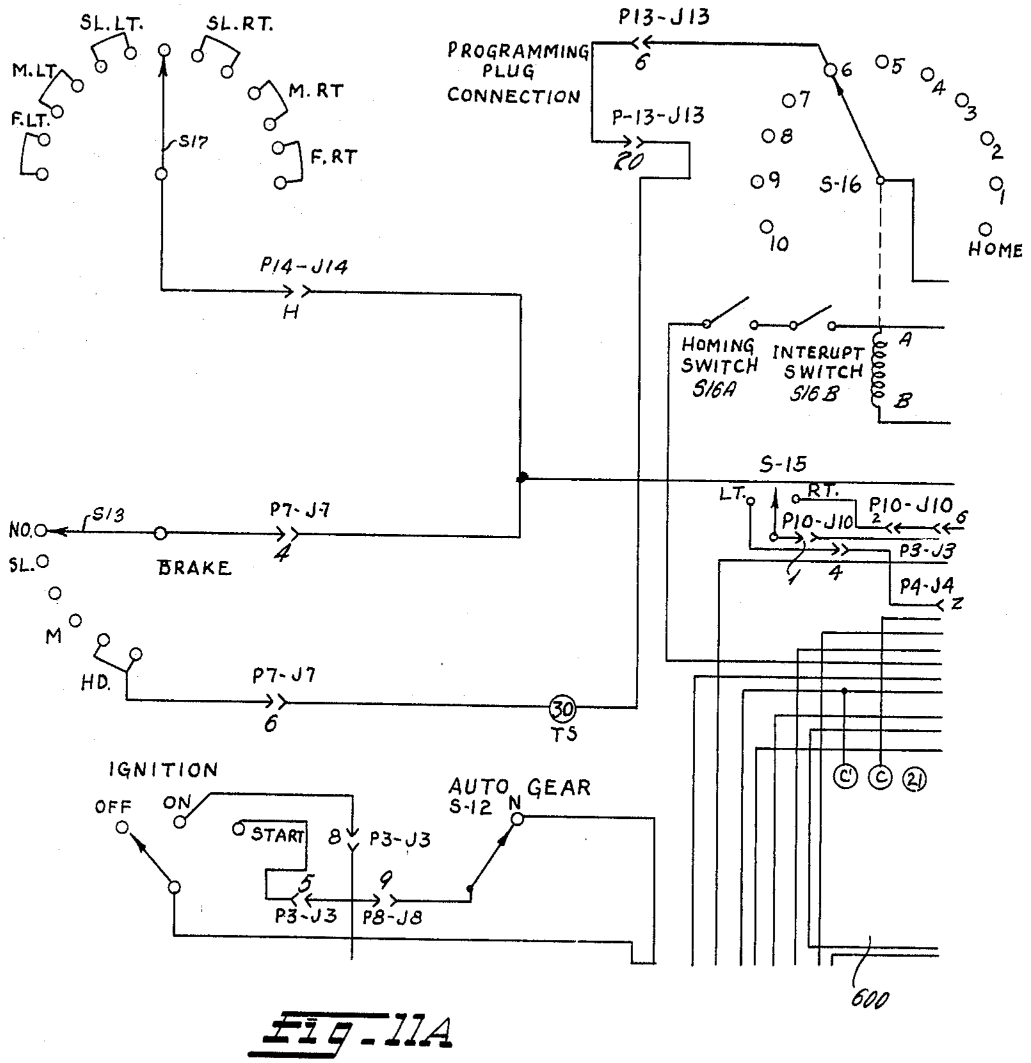
Figure 11:
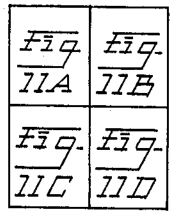
Figure 11B:
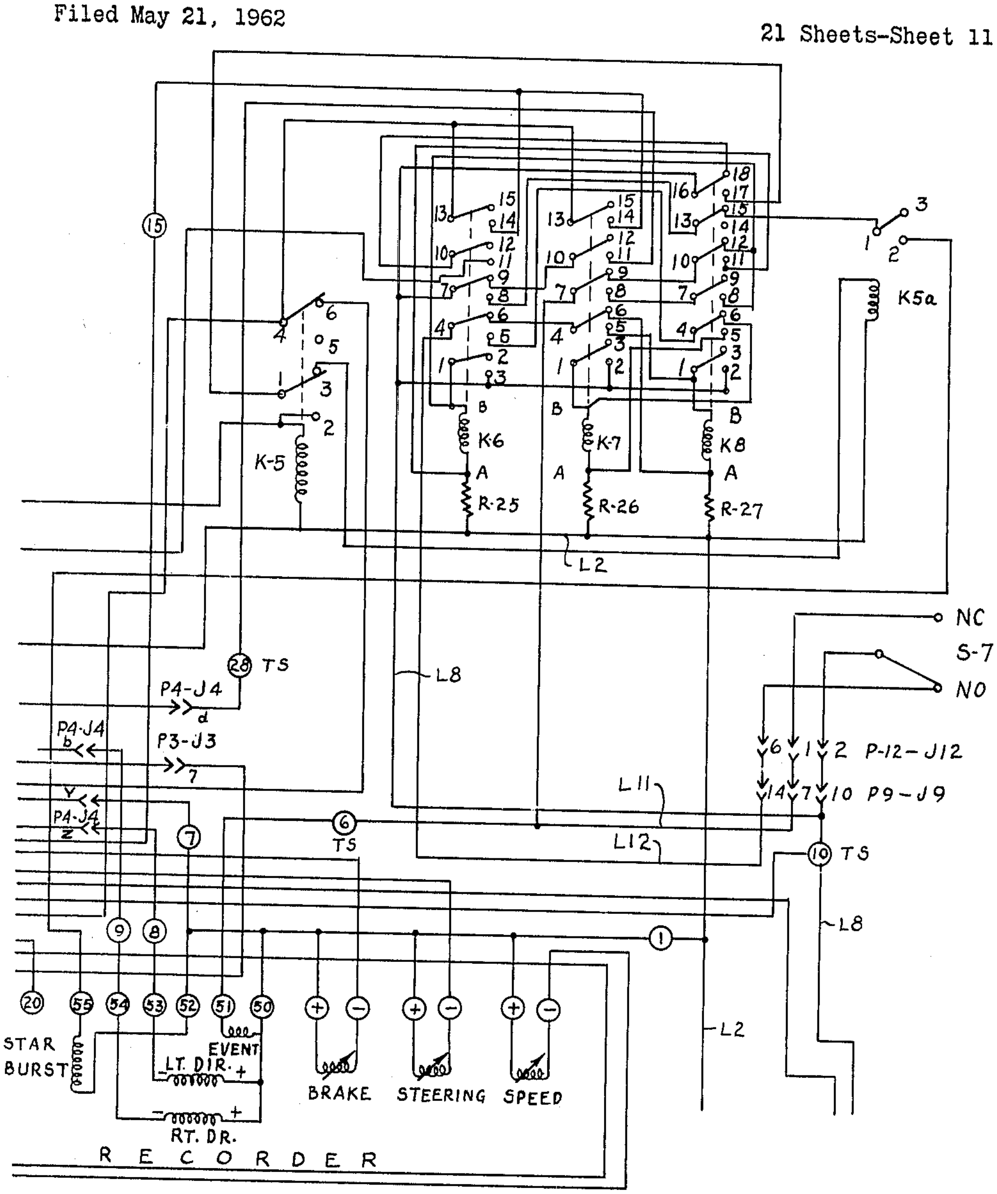
Figure 11C:
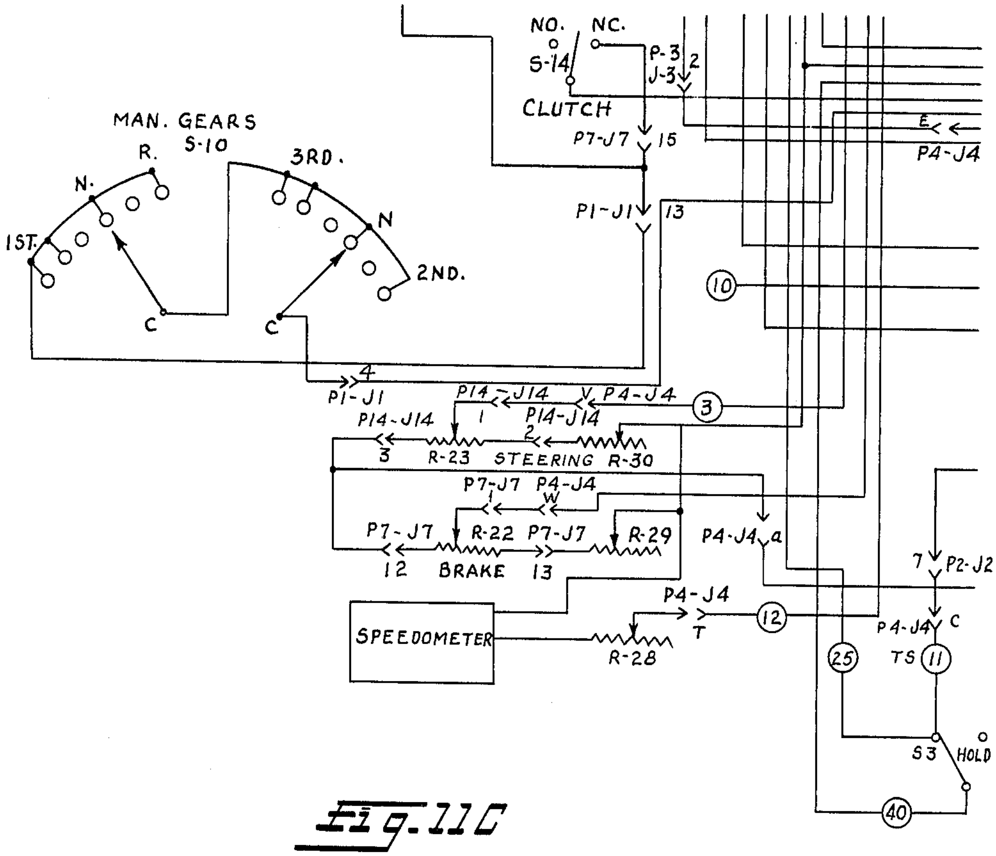
Figure 11D:
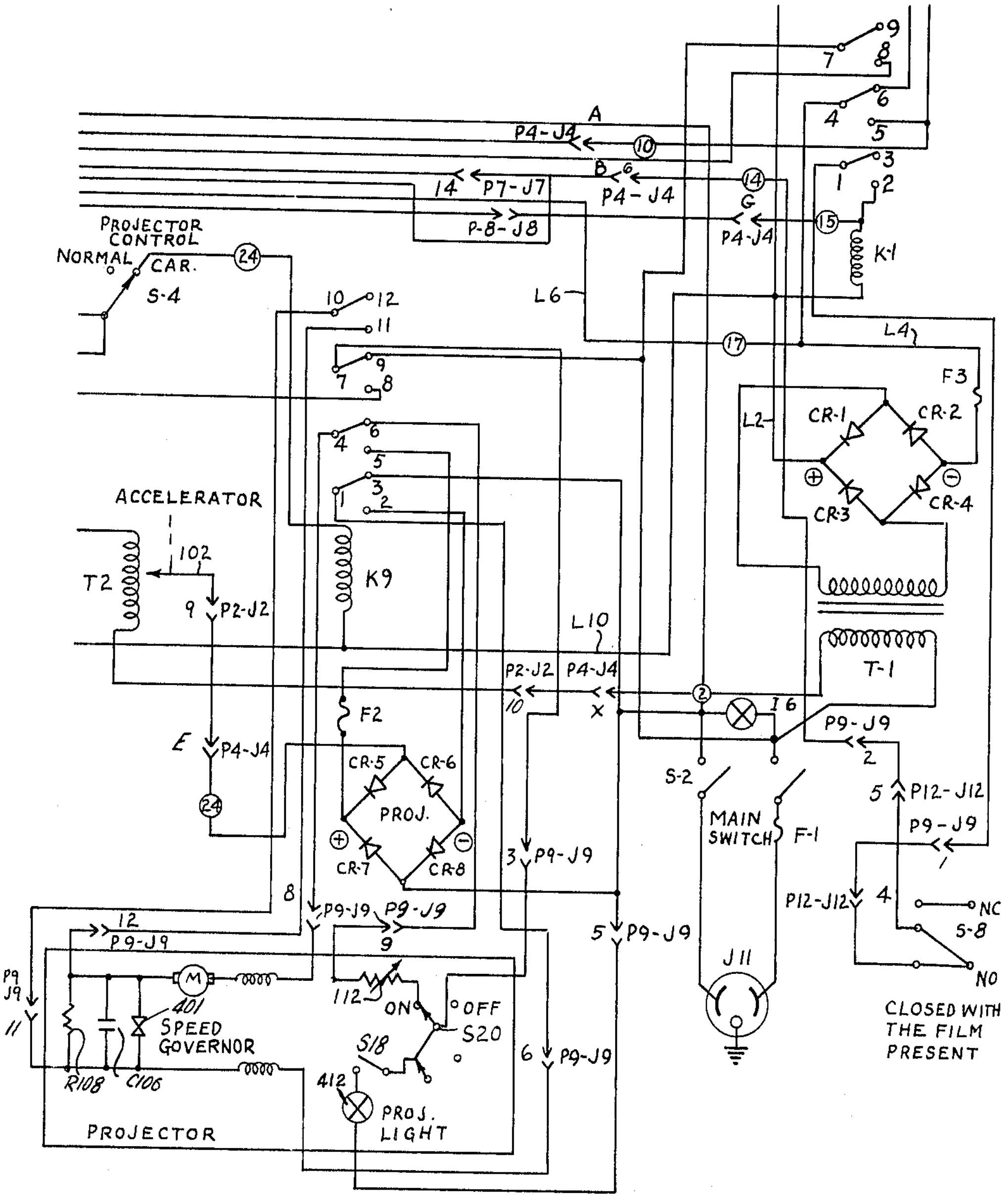
Figures 12, 12A:
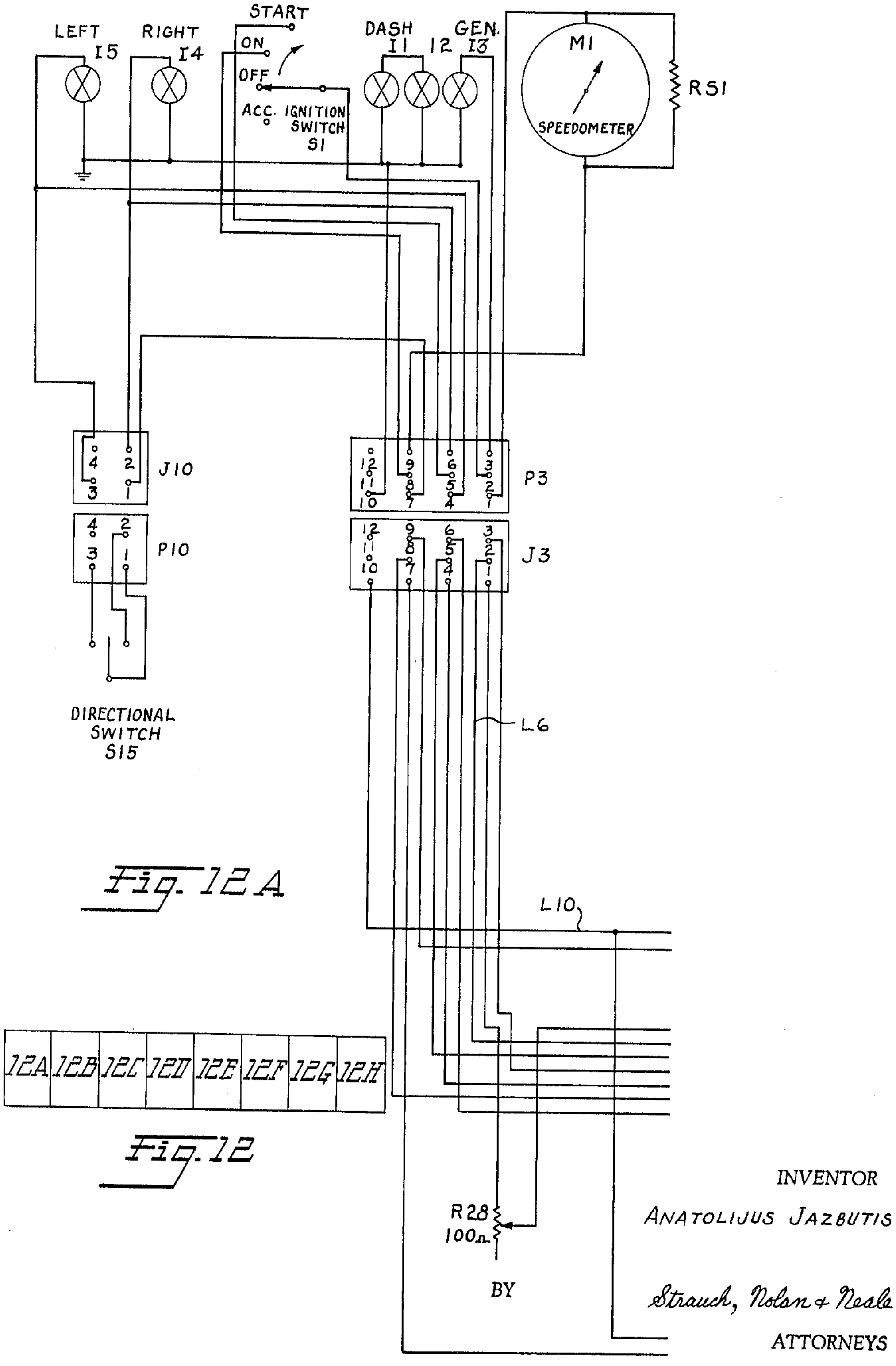

FIGURES 11*a*, 11*b*, 11*c* and 11*d* when assembled as illustrated in FIGURE 11 constitute a simplified schematic diagram of the circuit of the simulator of FIGURE 1; and FIGURES 12*a–h* when assembled as illustrated in FIGURE 12 constitute a complete schematic diagram of the circuit of the simulator of FIGURE 1.

*General*

Referring now to FIGURE 1, the novel vehicle operation simulator of the present invention includes a simulated vehicle 200, a motion picture film projector 400 (see FIGURE 1A), a screen 500, and a strip chart recorder 600. Recorder 600 is housed in a cabinet 602 together with a control unit 604. Cabinet doors 606 and 608 enable access to storage shelves (not shown) below control unit 604. Projector 400 is housed in a cabinet 402 supported on cabinet 602 and provided with doors 404 and 406 enabling access to the projector.

Simulated vehicle 200 is equipped with a seat 201 and conventional operator-actuated vehicle controls such as a steering wheel 202, a gear shift lever 204, an accelerator 206, a clutch pedal 208, and a brake pedal 210. Vehicle 200 also includes an instrument panel 212 in which are mounted conventional automotive instruments such as an ignition switch S1, a speedometer M1, right and left directional signals I4 and I5 (see FIGURE 12A), conventional instrument panel lights I1, I2 and I3, and a push-button cluster 213 for simulating operation of an automatic transmission. The vehicle is pivotally mounted on a base 214 and pivots in response to operator manipulations of steering wheel 202 to increase the operator's sensation of driving an actual vehicle.

Projector 400 is, in the illustrated exemplary system, a 16 millimeter sound projector and is preferably of the continuous type such as that shown in United States Patent No. 2,341,313 issued February 8, 1944, to C. Chedister for "Continuous Motion Picture Projector" or equipped with a continuous feed attachment such as that shown in United States Patent No. 2,875,667 issued March 3, 1959, to C. Chedister for "Continuous Feed Attachment" so that a selected film may be projected without the necessity of rewinding. The film includes a series of stimuli such as traffic hazards and incidents which might be encountered in travelling along a highway arranged in a logical order. For example, a sequence may show putting an automobile in motion followed by turning a corner, approaching a traffic light, nearing a pedestrian, etc. Or the scene may present a more elementary sequence such as starting the vehicle motor, releasing the parking brake, shifting through the gear range with accompanying clutch manipulations, and subsequent braking to bring the vehicle to a halt.

Passage of the film through the projector (1) conditions various control circuits which may then be activated by manipulation of one or a combination of vehicle controls, and (2) presents a series of stimuli to the vehicle operator to which he must respond by appropriate manipulation of the selected control or controls in order to avoid a hazardous situation.

For example, the film may include a scene of a child darting into the street immediately in front of the simulated vehicle. During the initial portion of the scene, the film will cause conditioning of a circuit that may be completed by hard depression of brake pedal 210. The operator viewing the scene, is, at nearly the same time, stimulated to apply the brake as hard as possible to avoid colliding with the child.

In filming the scene the camera car preferably follows the collision course which the operator of the simulated vehicle will find himself upon if he does not respond in the correct manner to the particular incident projected. It is, however, psychologically frustrating to a driver who has taken the proper action to find himself viewing the course which would result from improper action. To avoid such driver frustration, the appropriate vehicle control (or controls) which, if the operator properly responds to a given incident, will be manipulated in a particular manner, are connected through the conditioned circuits referred to above to projector 400. If the operator correctly responds to the presented stimulus, the control manipulated by the operator will activate the conditioned circuit to extinguish the projector lamp for a brief interval and prevent the collision course from being presented to the operator.

Thus, in the foregoing example of the child darting into the street, if the operator properly responds by "jamming" on the brake 210, screen 500 will go blank for a brief interval. When the picture returns, it will show the vehicle proceeding along, at least momentarily, an uneventful stretch of road.

If, on the other hand, the driver does not apply his brakes soon enough, or hard enough, the conditioned circuit will remain unactivated and the projector lamp will not be extinguished. In this circumstance the driver will be presented with the collision course followed by, at the moment the accident would occur, a vivid burst of bright color or a starburst. It has been found that the starburst is extremely effective in impressing the operator with his failure to make a proper response being, in this respect, superior to displaying a maimed body or similar scene.

A speaker SP1 of conventional construction (FIGURE 12*c*) cooperates with the sound track of the projected film to provide appropriate sound effects as the test sequence proceeds. Speaker SP1 is driven by a sound amplifier through a sound output in projector 400 (see FIGURE 12*h*) in the conventional manner.

In order to permanently record the operator's reactions, the various vehicle controls are connected through the circuits referred to above to recorder 600.

Recorder 600 is preferably a two-speed strip chart recorder designed to accommodate a strip chart 616 (see also FIGURE 9) on which the operator's manipulations of accelerator 206 (speed), steering wheel 202 (steering), and brake pedal 210 (brake) are continuously recorded. To aid in the interpretation of the foregoing recordings, and indication of the start of each event, such as the child darting into the street, is also recorded. Additional information recorded includes the occurrence of starbursts and the turning on of directional signals I4 and I5.

The screen 500 on which the road scene is displayed may be mounted on a stand 502 as shown in FIGURE 1 or may be hung on a wall. The screen surface 504 (FIGURE 4) has a substantial degree of concavity which enhances the realism of the scene displayed upon it.

*Simulator operation*

The operation of the novel vehicle operation simulator of the present invention will be explained primarily by reference to the simplified schematic diagram provided by FIGURES 11A–11D with additional reference, at times, to the complete schematic diagram provided by FIGURES 12A–12H.

Referring first to FIGURE 11D, plug J11 is connected to a source of 115-volt, 60-cycle alternating current. The simulator may then be turned on by closing cabinet safety switch S19 (FIGURE 12H) and main on-off switch S2 (FIGURES 11D and 12H), both of which are located in the cabinet-mounted control panel 604. Closing of switches S19 and S2 applies operating voltage through main fuse F1 to a pilot lamp I6 in control unit 604 and, through connector P6–J6, to a pilot lamp I7 in the instrument panel 212 of the simulated vehicle 200. A return to plug J11 is provided through now closed switch S2. Pilot lamps I6 and I7 light, providing an indication to the instructor, who is normally stationed in the vicinity of the control unit, and to the operator of the simulated vehicle that the vehicle operation simulator is on.

Figure 12B:
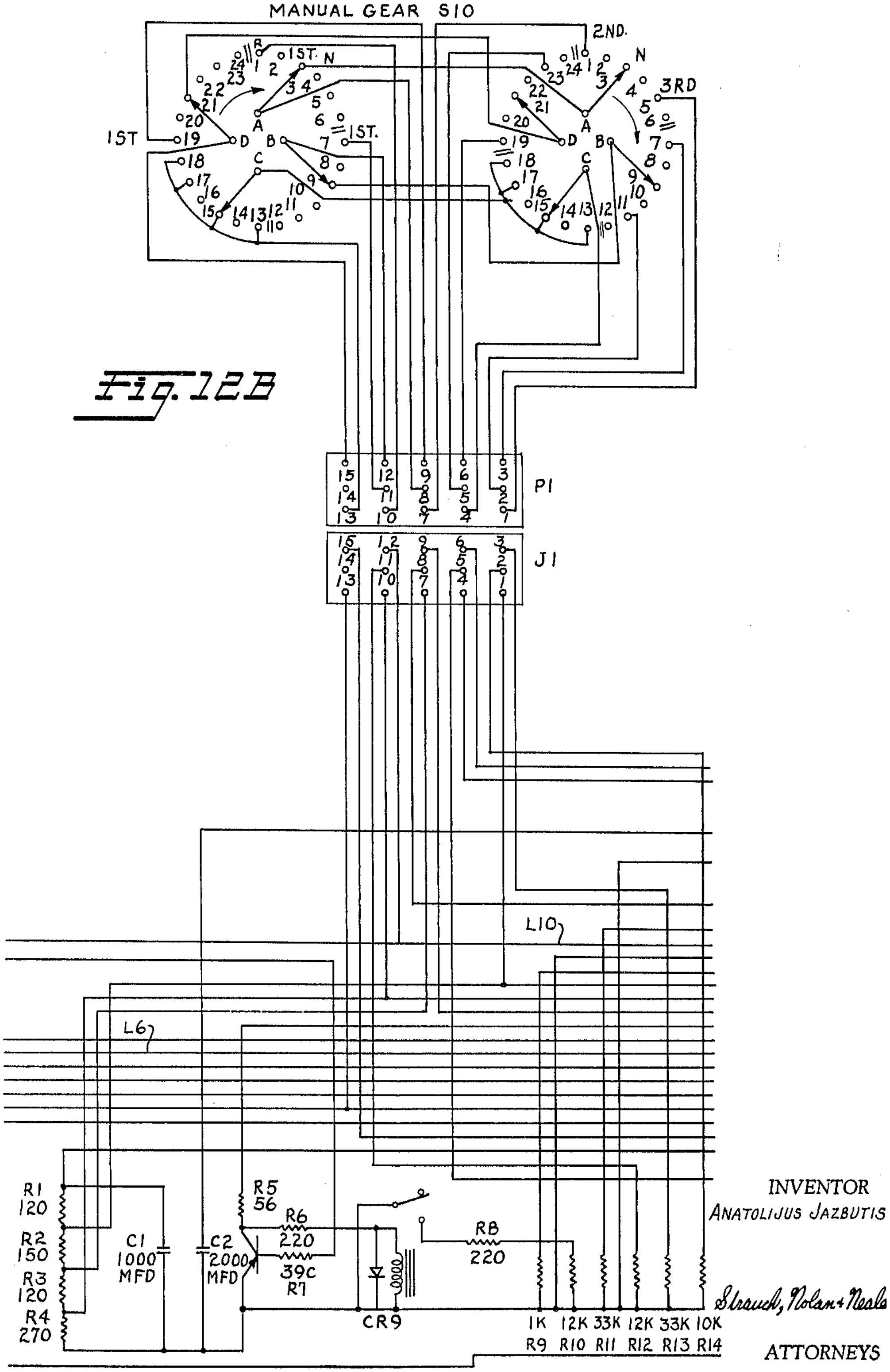
Figure 12C:
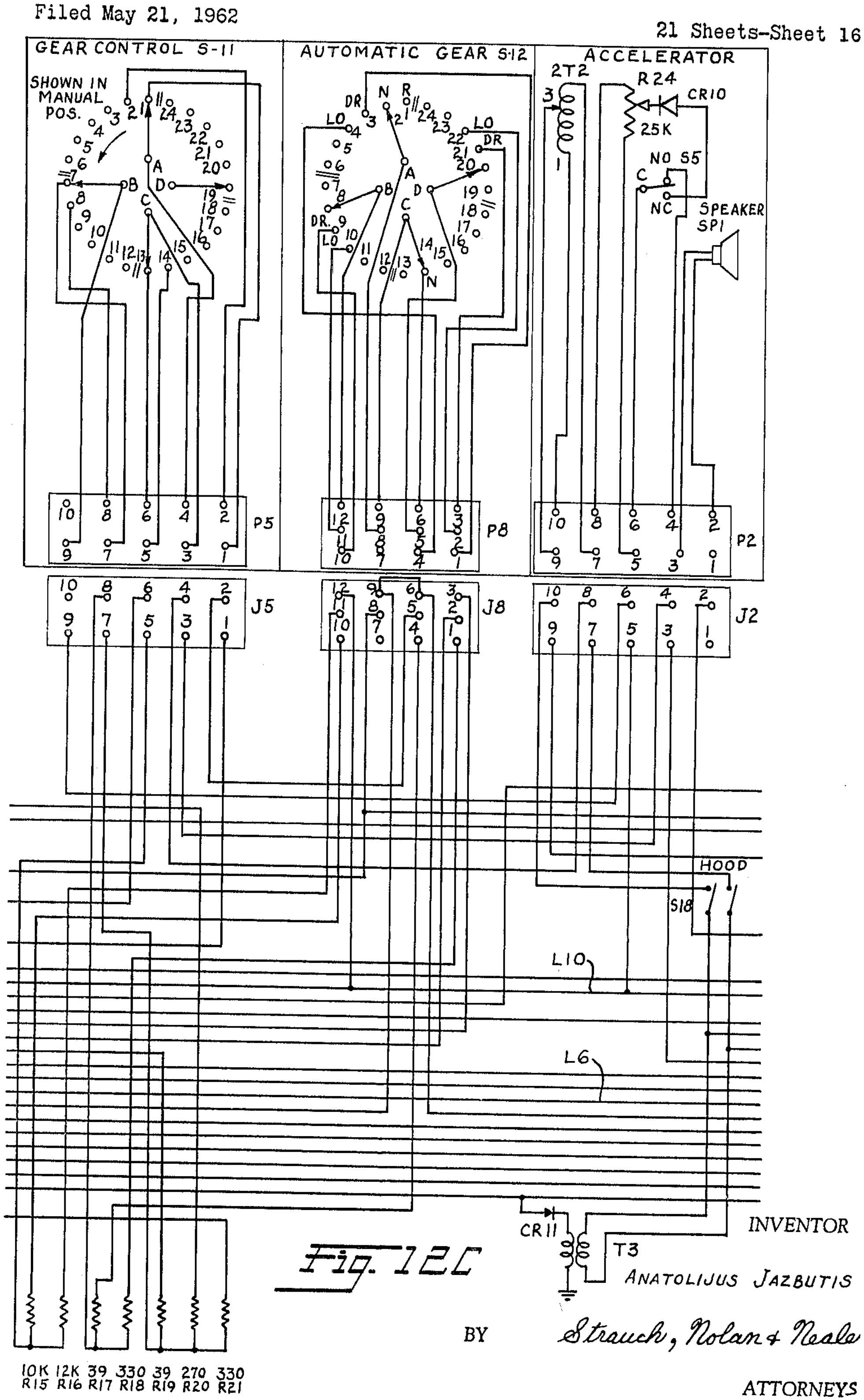
Figure 12D:
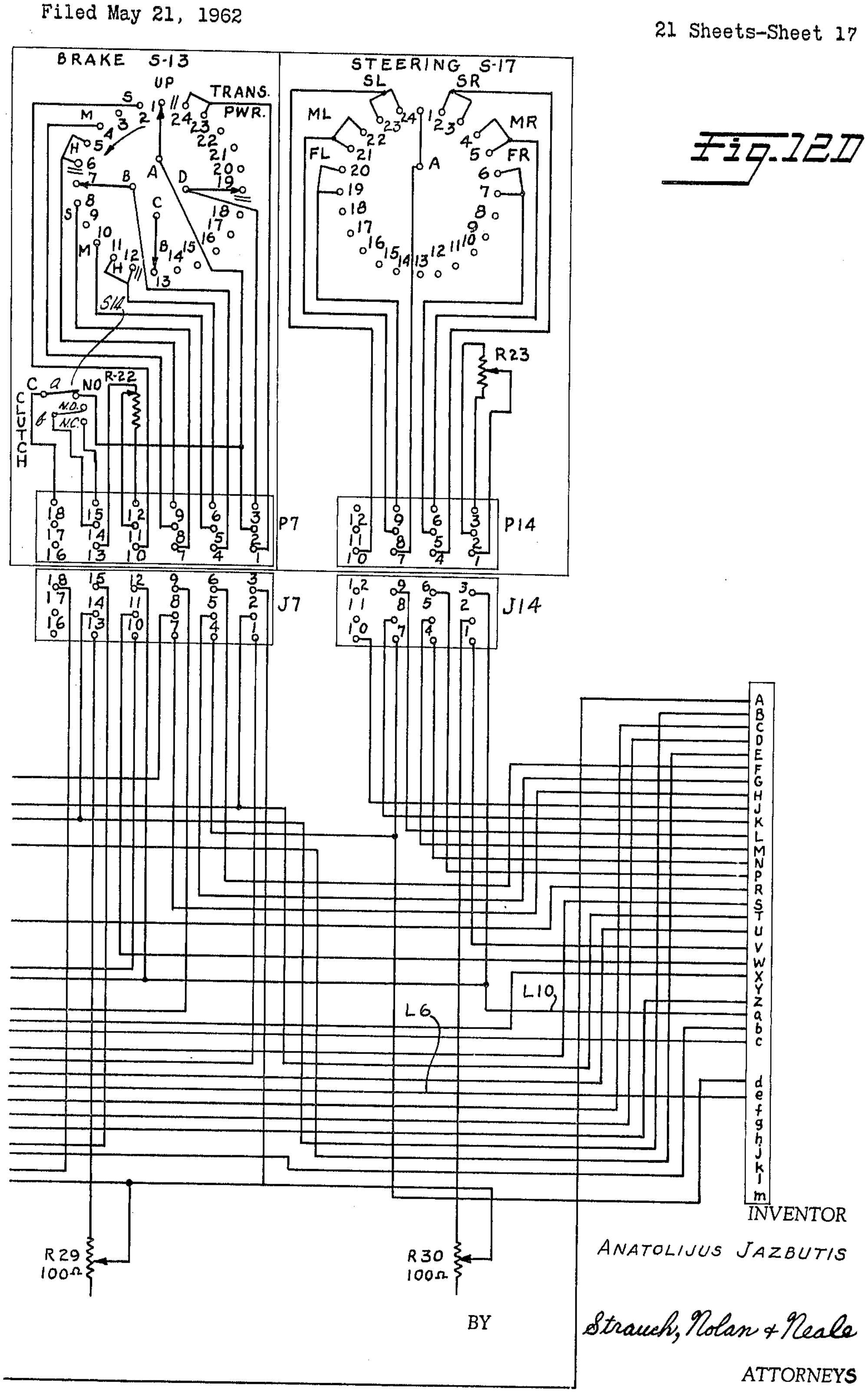
Figure 12E:
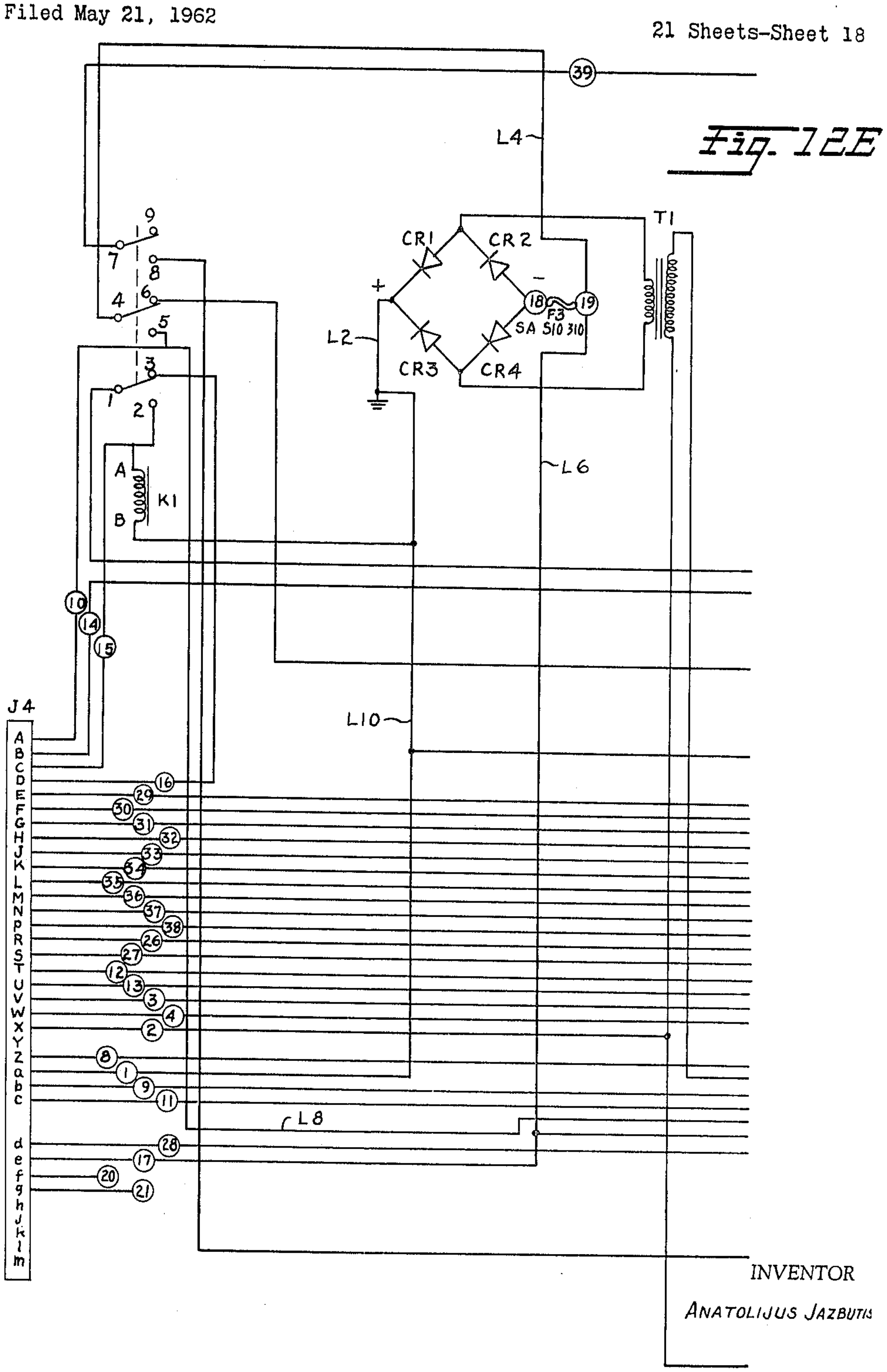

The 115-volt operating voltage is also applied to the primary winding of transformer T1 (FIGURES 11D and 12E). The secondary winding of transformer T1 is connected to the main power rectifier provided by diodes CR1–CR4. Positive D.C. voltage therefore appears on the main rectifier positive output at the junction of diodes CR1 and CR3 and negative D.C. voltage on the negative output at the junction of diodes CR2 and CR4. A main positive D.C. lead L2 is connected to the positive rectifier output and a main negative D.C. lead L4 to the negative rectifier output through fuse F3. Positive lead L2 is connected to relays K1, K5, **K5*a*, K6, K7 and K8 and to the terminal B of the solenoid of a stepper switch S16 of conventional design. The opposite terminal A of the stepper switch solenoid is connected through stepper switch interruptor contacts S16B and stepper switch homing contacts S16A to negative D.C. lead L8 which is connected to the main negative lead L4 by the contacts 6 and 4 of relay K1 which are closed when the relay is de-energized. The circuit thus provided energizes the stepper switch solenoid to step switch S16 to the "home" position. The homing operation of stepper switch S16** is conventional and is, therefore, not believed to require elaboration.

Further energization of the simulator circuitry is accomplished by the simulator operator at the beginning of the test sequence as he responds to the stimuli presented by the projector 400 or to the instructor's oral instructions to start the simulated vehicle 200.

Before considering the operator-initiated circuitry energization, it should be noted that the simulator of the present invention is arranged to simulate both an automatic and a manual transmission. A gear control switch S11 (FIGURE 12C), which may conveniently be mounted in car simulator unit 200, enables the selection of either automatic or manual transmission simulation. The circuitry necessary to provide transmission simulation which is illustrated, in main part, in FIGURES 12B and 12C is not part of the present invention and a detailed description of this circuitry is therefore not believed to be warranted, especially as it is described at length in copending application Serial No. 93,538 filed March 6, 1961. In the ensuing description of the present invention it will be assumed that manual transmission simulation has been selected.

The simulated vehicle 200 provides a starting sequence identical to that of a real automobile. Thus, manual transmission simulation having been selected, the operator moves gearshift 204 to neutral, positioning manual gear switch S10 as shown in FIGURES 11C and 12B. For manual transmission simulation, the neutral button (not shown) in push-button cluster 213 is depressed, positioning automatic gear switch S12 as shown in FIGURES 11A and 12C. Next, the operator moves ignition switch S1 (FIGURES 11A and 12A) from "off" to "start," completing a circuit from the negative output of the main power rectifier to ignition switch S1 through fuse F3, the main negative D.C. lead L4, lead L6, terminals E of main terminal strip P4–J4 and pins 2 of connector P3–J3. The circuit is continued from switch S1 through its "start" contact, pins 5 of connector P3–J3 and 9 of connector P8–J8, gear switch S12, pins 6 of connector P8–J8 and terminals G of main terminal strip P4–J4 located in control unit 604 to relay K1 (FIGURES 11D and 12E), which is connected to the positive main power rectifier output by the main positive D.C. lead L2, energizing relay K1.

When the simulator operator releases ignition switch S1, the switch will, as in a conventional automobile, automatically move from the "start" position to the "on" position. Movement of ignition switch S1 to the "on" position provides a locking path for relay K1 from negative lead L6 through ignition switch S1, its "on" contact, pins 8 of connector P2–J3, pins 13 of connector P1–J1, manual gear switch S10, pins 4 of connector P1–J1, terminals B of main terminal strip P4–J4, terminal 14, pin 2 of connector P9–J9, pin 5 of connector P12–J12, the film presence switch S8 (in closed position as shown in FIGURE 11D with the film present), pin 4 of connector P12–J12, pin 1 of connector P9–J9, and through contacts 1 and 2 and the coil of the relay K1 to the main positive lead L2. Thus, the simulator car cannot be maintained in the ignited position without the film present in the projector.

Energization of relay K1 opens its contacts 4 and 6, de-energizing stepper switch S16 which is by now in the "home" position. Contact 4 closes with contact 5, connecting negative lead L8 to the main negative lead L4.

Figure 12F:
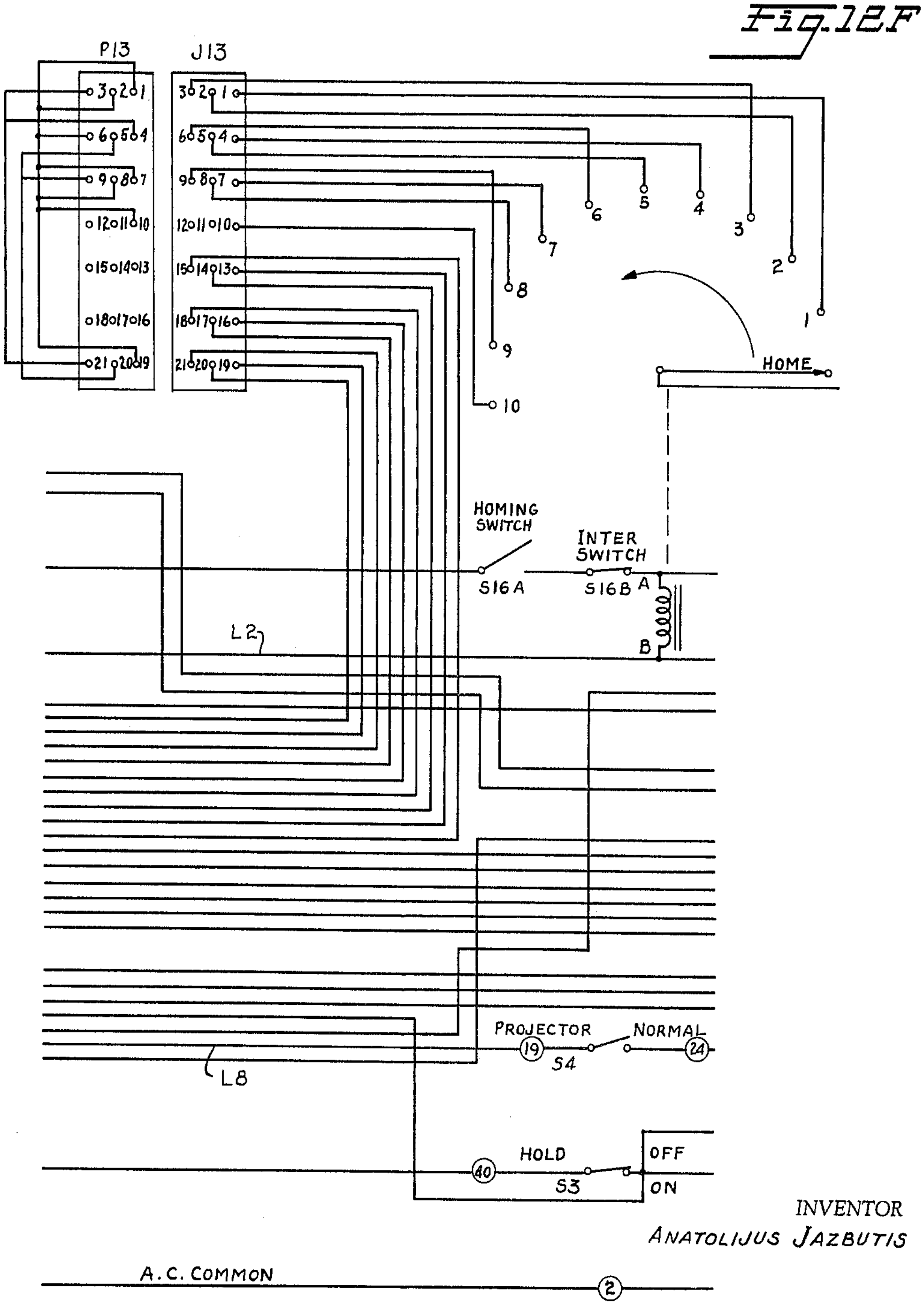
Figure 12G:
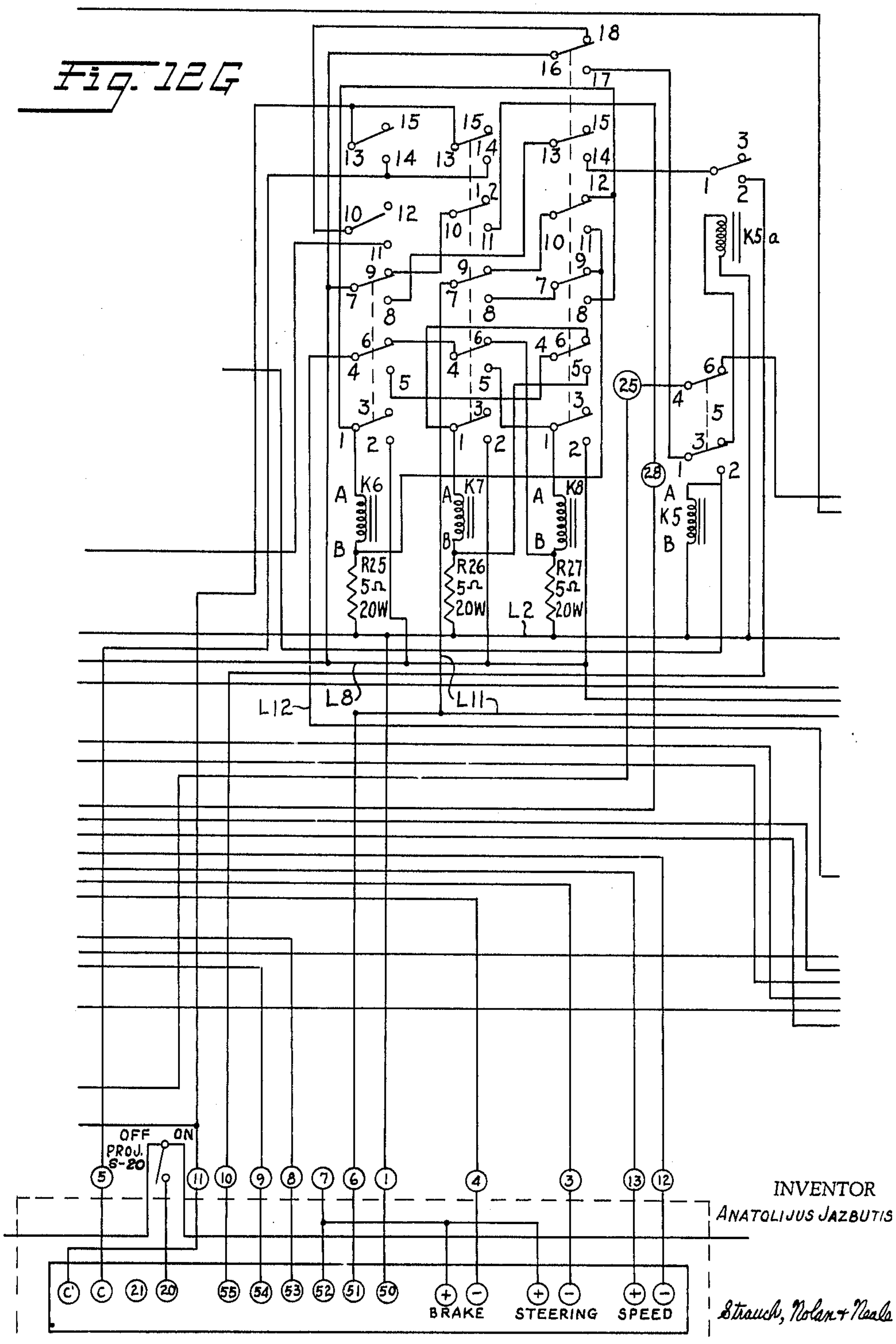

Negative lead L8 is connected through terminal 10 to the arm of projector control switch S4 (see FIGURES 11D and 12F). With projector control switch S4 in the "car" position as shown in FIGURE 11D, negative voltage is applied through terminal 24 to relay K9 which is connected by lead L10 to positive lead L2, energizing relay K9 to provide power for the operation of projector 400 in the control of simulated vehicle 200.

Also, when relay K1 is closed, a circuit is completed from plug J11 through fuse F1, main switch S2, terminal 39, the now closed contacts 7 and 8 of energized relay K1, terminal 40, hold switch S3, terminals 6 of terminal strip P4–J4, pins 7 of connector P2–J2, an auto-transformer T2, pins 10 of connector P2–J2, terminals X of terminal strip P4–J4, terminal 2, and main switch S2 to plug J11, applying the 115 volt operating voltage to the winding of the auto-transformer. The output of accelerator auto-transformer T2 is taken from a sliding arm 102 which is mechanically coupled to accelerator pedal 206. Thus, the output voltage of the accelerator auto-transformer T2 will be varied as the simulator operator manipulates accelerator pedal 206.

The output voltage from transformer T2 is applied through connector pins 9 of connector P2–J2, pins E of terminal strip P4–J4, and terminal 29 to the projector rectifier provided by diodes CR5–CR8. A return lead to the power source is provided from the projector rectifier through the main switch S2 to plug J11. Consequently, the input voltage applied to the projector rectifier is varied as the simulator operator manipulates accelerator pedal 206.

The projector rectifier output voltage, which varies as the input voltage is applied from the positive rectifier output at the junction of diodes CR5 and CR7 through fuse F2, contacts 5 and 4 of energized relay K9, and pins 8 of connector P9–J9 to the projector motor M, which is connected to the negative output of the projector rectifier at the junction of diodes CR6 and CR8 through projector speed governor 401, pins 6 of connector P9–J9 and contacts 1 and 2 of relay K9.

It will be apparent, from the foregoing circuit description, that the voltage applied to the projector motor M will be varied as the simulator operator manipulates accelerator pedal 206. In this manner, the projection speed of the projector is varied with manipulations of the accelerator pedal to provide the operator with a realistic sense of increasing and decreasing speed as he respectively depresses and releases the accelerator pedal.

Figure 12H:
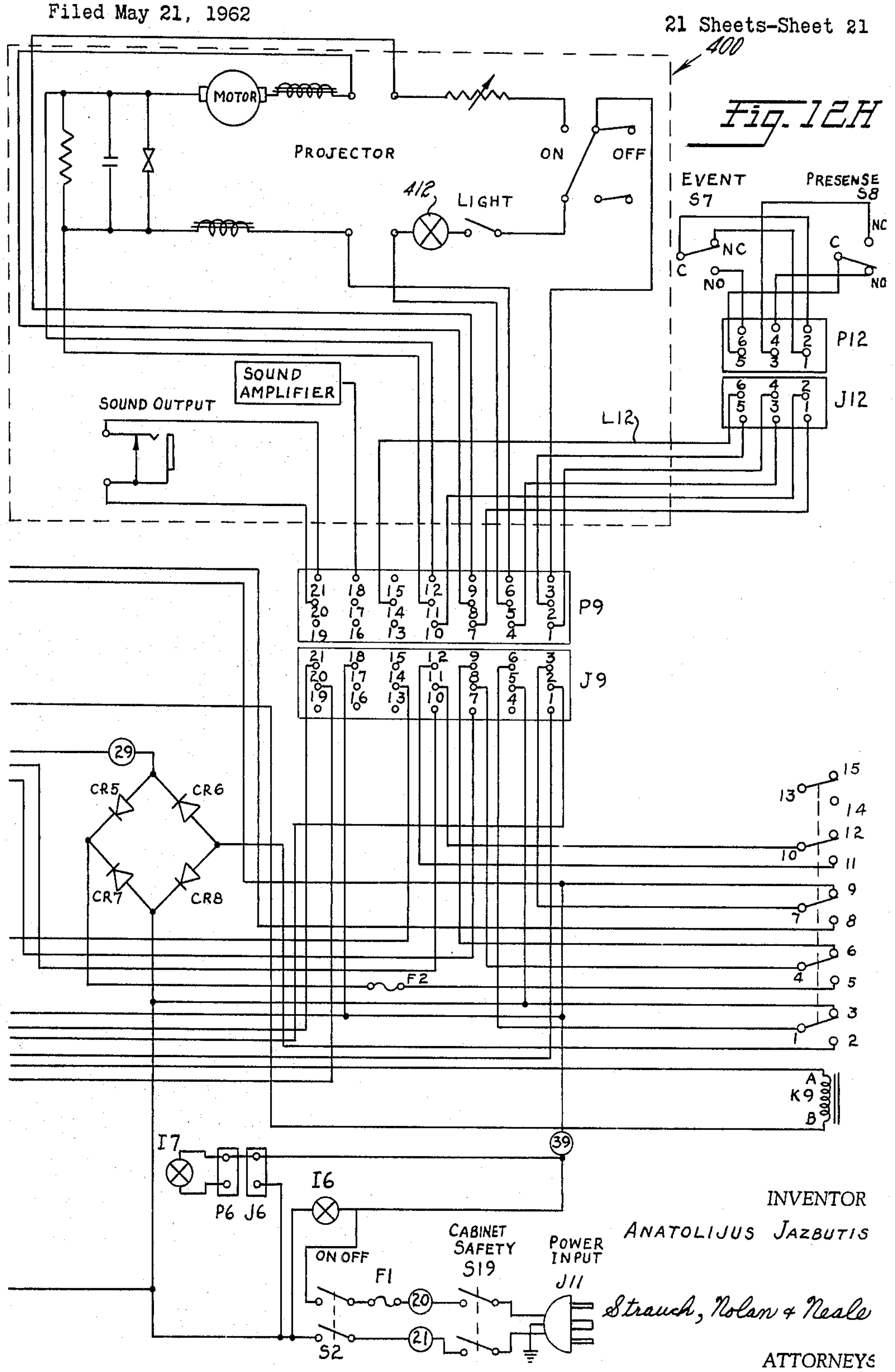

Connected between the negative output of the projector rectifier and projector motor M is the speed governor 401 which operates in a conventional manner to maintain constant the speed of the projector motor. Speed governor 401 is shorted out when projector control switch S4 is in the "car" position so that the projection speed may be controlled by the simulating operator through his manipulations of accelerator pedal 206. The circuit provided for this purpose is illustrated in FIGURES 11D and 12H and includes a capacitor C106 and a resistor R108 connected in parallel with each other and with speed governor 401. With projector control switch S4 in the "car" position, so that relay K9 is energized, a bypass around governor 401 is provided from projector motor M to the negative output of the projector rectifier through pins 12 of connector P9–J9 and contacts 11 and 10 of relay K9. The bypass effectively short-circuits the governor 401, resistor R108 and capacitor C106. Therefore, current will cease to flow through the latter and its speed controlling effect on the motor M will be prevented.

The closing of relay K9, in addition to permitting the application of operating voltage to projector 400, lights projector lamp 412 (provided that the projector on-off switch S20 and the projector lamp switch S18 are closed). The projector lamp circuit is as follows: from plug J11 through main switch S2, pins 5 of connector P9–J9, projector lamp 412, projector lamp switch S18, projector on-off switch S20, pins 3 of connector P9–J9, contacts 7 and 8 of relay K9, contacts 4 and 6 of relay K5 (FIGURES 11B and 12G), hold switch S3 (FIGURES 11C and 12F), terminal 40, contacts 8 and 7 of relay K1 (FIGURES 11D and 12E), main switch S2, and fuse F1 to plug J11.

At this point in the operational sequence of the simulator the operator of the simulated vehicle 200 will have completed the starting sequence and operation of projector 400 will have been initiated. During this introductory portion of the test sequence, it will normally be desirable to convey instructions to the operator to the simulated vehicle as, for example, to explain to him the nature of the test. For such preliminary explanation, it is desirable that projector 400 operate at its constant speed (normally 24 frames per second) to, among other things, prevent the distortion in sound which accompanies variations in projector speeds. To permit constant projection speed, projector control switch S4 is provided with a second position designated "normal" (see FIGURES 11D and 12F). If the instructor desires to provide constant speed operation of projector 400, he may do so by moving projector control switch S4 to the "normal" position. This interrupts the circuit to relay K9 which is thereby de-energized, opening its contacts 10 and 11 and interrupting the low impedance bypass around speed governor 401. The short on the speed governor is thereby removed and projector motor speed is controlled and maintained constant by the governor.

With relay K9 de-energized, operating voltage is applied to the projector motor M from plug J11 through main fuse F1, main switch S2, contacts 7 and 9 of relay K9, projector on-off switch S20, rheostat 112, pins 9 of connector P9–J9 and contacts 4 and 6 of relay K9. The circuit is completed from motor M to plug J11 through governor 401, contacts 1 and 3 of relay K9, terminal 2, and main switch S2. A second circuit branches from the above-described circuit at switch S20 and proceeds through switch S18 to projector lamp 412, applying operating voltage to the lamp. This circuit is completed through pins 5 of connector P9–J9 and main switch S2 to plug J11. It will be noted that these circuits may be completed without energizing relay K1. The instructor may thereby operate projector 400 without manipulating the controls of simulated vehicle 200 through the starting sequence described above. This adds flexibility to the system, permitting introductory or explanatory scenes to be shown at the initial portion of the test. These scenes might, for example, explain to the operator the correct starting procedure.

Energization of relay K1 also completes a low speed circuit to the two speed strip chart recorder 600 by applying the 115 volt operating voltage to recorder terminals 20 and C′. Terminal 20 is connected by terminal 2 and main switch S2 to power supply plug J11. Recorder terminal C′ is connected through terminal 25, hold switch S3, terminal 40, contacts 8 and 7 of relay K1, terminal 39, main switch S2, and fuse F1 to the opposite side of power supply plug J11.

Figure 9:
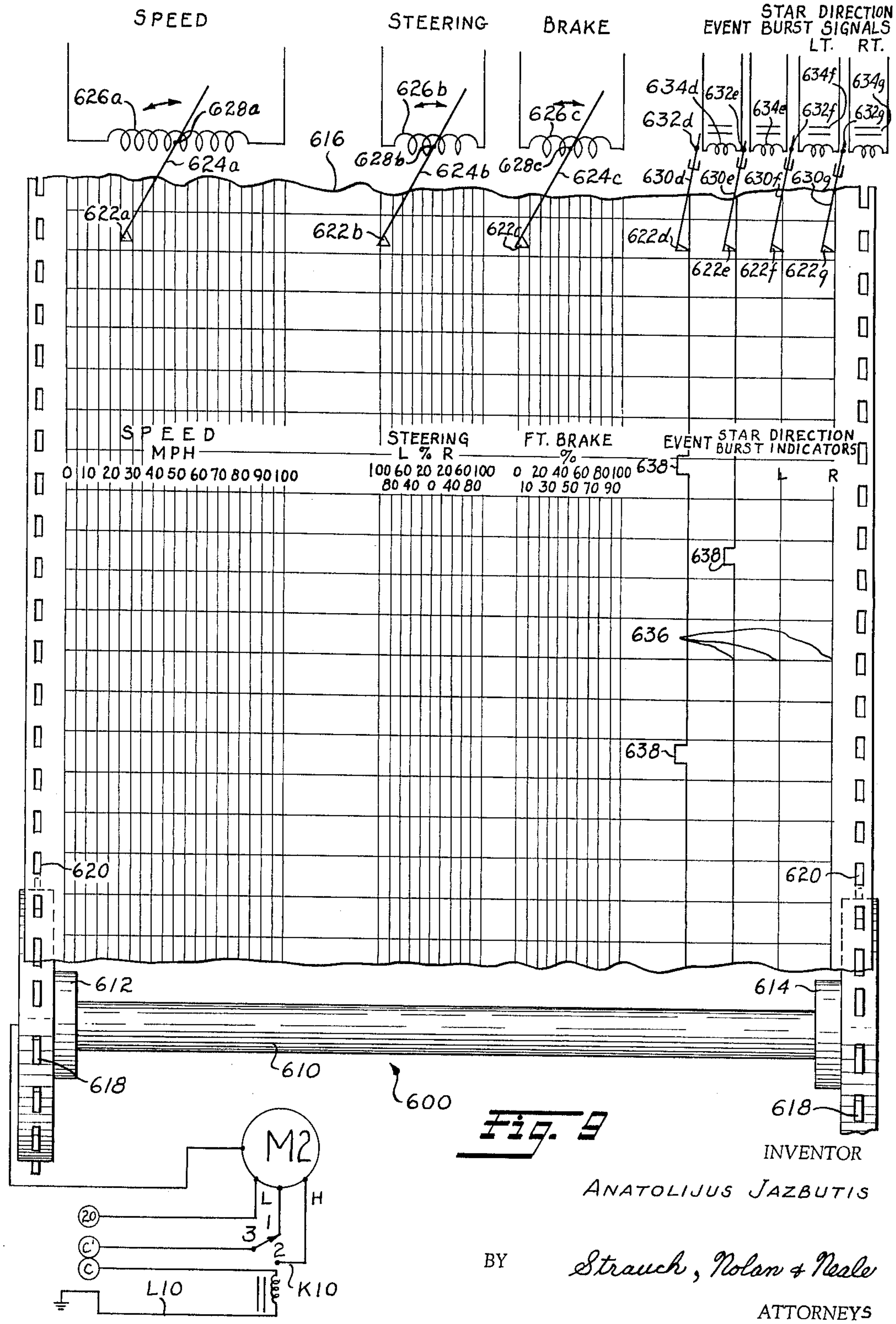
FIGURE 9 is a diagrammatic illustration of the recorder employed in the simulator.

As may be seen in FIGURE 9, this circuit supplies operating voltage to the motor M2 of strip chart recorder 600 which is illustrated diagrammatically, as it is of conventional construction and forms no part of the present invention. Recorder motor M2 drives a shaft 610 having drive sprockets 612 and 614 fixed to its opposite ends. A strip chart 616 is pulled through the recorder by the drive sprockets 612 and 614, the teeth 618 of which engage perforations 620 on the opposite edges of the strip chart.

Strip chart 616 is provided with seven columns to record the operation of simulated vehicle 200 during a test sequence. In three of the columns the speed, steering and brake application of the simulated vehicle is recorded. The fourth column is employed to provide an indication of the start of a test incident such as, for example, a child darting into the street in front of the simulated vehicle. The fifth column provides a starburst indication if the vehicle operator does not take the proper corrective action upon being presented with a test incident. The sixth and seventh columns may be employed to record the proper employment of other vehicle controls such as the left and right directional signals I5 and I4. Strip recorder 600 includes a marking pen 622 diagrammatically illustrated for each of the seven chart columns. Marking pens 622*a–c*, which may be supplied with ink in any desired manner, are mounted on the end of galvanometer pointers 624*a–c*, respectively. As the voltage applied to the galvanometer coils 626*a–c* associated with the pointers is varied, in a manner and through circuits which will be explained in detail presently, the galvanometer pointers 624*a–c* are caused to pivot about the bearings 628*a–c* on which they are mounted.

To illustrate the manner in which the speed, steering or braking record of a test sequence is made, it will be assumed that the test sequence projected on screen 500 calls for a manipulation of accelerator pedal 206. Thus, if the operator of the simulated vehicle is presented with a scene illustrating a traffic light changing from red to green, his correct response will be to depress accelerator pedal 206 to put the simulated vehicle in motion and proceed along the road presented by the scene. As the accelerator pedal 206 is depressed, increased voltage is, through a circuit which will be described presently, applied to the galvanometer coil 626*a* associated with the column marked "speed" on strip chart 616, causing galvanometer pointer 624*a* to pivot in a counterclockwise direction in its pivot bearings 628*a*. This, in turn, causes marking pen 622*a* to swing to the right (as viewed in FIGURE 9), providing a continuous, varying line in the speed column indicating increasing speed. The record made in the "steering" and "brake" columns of strip chart 616 is produced in a similar manner.

The marking pens 622*d–g* in the remaining columns are mounted on arms 630*d–g* pivoted on suitable bearings 632*d–g*, respectively. Arms 630*d–g* are pivoted by solenoids 634*d–g*. Pens 622*d–g* normally produce a straight line as indicated by reference character 636. However, when one of the solenoids 634*d–g* is energized, the arm 630 associated with the energized solenoid is momentarily swung in a clockwise direction, causing the marking pen 622 mounted on it to produce a discontinuity or pip 638.

Solenoid 634*d* is energized at the start of a test incident, the portrayal of an obstruction in the road for example, by the closing of "event" switch S7 which is operated by notches 1–4 (see FIGURE 10) formed in an edge of the projected film. The pip 638 produced by the energization of event solenoid 634*d* provides a frame of reference to aid in interpreting the simulator operator's reaction to the stimuli presented to him by the test incident.

The starburst solenoid 634*e* is energized only if the operator fails to take the proper corrective action in response to the test incident stimuli. The starburst column, therefore, records improper operator responses. The left and right directional signal solenoids 634*f* and 634*g* are activated, through circuits to be described hereinafter, by the operator's manipulation of a conventional turn signal indicator incorporated in the simulated vehicle 200.

In addition to initiating projector and recorder operation as just described, the closing of relay K1 also, by connecting negative leads L4 and L8, completes a circuit through pins 10 of connector P9–J9 and pins 2 of connector P12–J12 to the "event" switch S7 located in projector 400 (FIGURES 11B and 12H). Switch S7 is arranged to sense the presence of notches on an edge of the film passing through projector 400 to control the operation of the projector and strip chart recorder 600 during the presentation of a test sequence.

As was discussed above, the instructor will normally maintain the simulated vehicle 200 out of the operator's control during the introductory portion of a test or training session so that he may convey information or instructions to the operator, either directly or by constant speed operation of projector 400.

When the preliminary instructions have been relayed to the simulator operator, the instructor may restore control of the simulated vehicle 200 to the operator by returning projector control switch S4 from the "normal" to the "car" position. At this point, simulated vehicle 200, projector 400, and recorder 600 are all conditioned for operation and projection of a scene providing one or more test sequences will be initiated. The first test sequence may, as in a real automotive vehicle, require the simulator operator to shift through the range of gears to put his vehicle in motion. It is one of the novel features of the present invention that, if the simulator is conditioned to simulate the operation of a manual transmission and the operator shifts gears without depressing clutch pedal 208, simulator operation will be interrupted, firmly impressing the mistake upon the operator's mind. The circuit arrangement provided to accomplish this function is described in the following paragraphs. Although this description relates only to shifting gears from neutral to first or low gear, it is to be understood that the operation is substantially identical in shifting to second or immediate gear, then to third or high gear, and in shifting from neutral into reverse gear.

With manual gear S10 in neutral, energizing voltage is applied to relay K1 from the main positive D.C. lead L2 through relay K1, relay K1 contacts 2 and 1, terminal 14, terminals B of main terminal strip P4–J4, pins 4 of connector P1–J1, manual gear switch S10, pins 13 of connector P1–J1, and ignition switch S1 to negative lead L6.

Clutch switch S14 (FIGURES 11A and 12D) is mechanically connected to clutch pedal 208 so that, when clutch pedal 208 is depressed, contactor *b* of switch S14 is transferred from contact NO to contact NC. It will first be assumed that the operator properly depresses clutch pedal 208 before moving gearshift lever 204 to shift from neutral to first gear. This, as was pointed out above, transfers the contactor of clutch switch S14 from contact NO to contact NC. Closing of switch S14 and its contact NC completes an alternate holding circuit through relay K1 which extends from the main positive D.C. lead L2 through relay K1, contacts 2 and 1 of relay K1, terminal 14, terminals B of main terminal strip P4–J4, pins 14 of connector P7–J7, clutch switch S14, its contact NC, pins 8 of connector P3–J3, pins 15 of connector P7–J7 and ignition switch S1 contact "on" to lead L6 to which, it will be remembered, negative voltage is applied from main lead L4. Thus, as long as clutch pedal 208 is depressed, relay K1 will not be de-energized by the interruption of its main holding circuit through manual gear switch S10 by manipulation of gear shift lever 204.

If the alternate holding circuit through clutch switch S14 is not completed by depressing clutch pedal 208, the main holding circuit through relay K1 will be interrupted when gearshift lever 204 is operated from neutral to low, moving contactors C of gear switch S10 from the N contacts to the contacts labeled "1ST." As was described above, relay K1 is the sole link between the main power rectifier and the simulator circuitry. Therefore, if the operator fails to depress clutch pedal 208 while shifting gears, interrupting the energizing voltage to relay K1, the entire simulator will be shut down, firmly impressing upon the operator's mind his failure to shift gears in the correct manner.

As was pointed out above, three of the parameters recorded by strip chart recorder 600 during the test sequence are speed, steering and braking effort. Also, as was pointed out above, reproduction of these parameters on strip chart 616 is dependent upon the application of a varying voltage to the galvanometer coils **626*a–c* to pivot the galvanometer pointers 624*a–c* on which the recording pans 622*a–c* are carried. The variable voltage applied to the speed galvanometer coil 626*a* is derived from the speedometer circuit shown, in main part, in FIGURE 11C. A circuit is provided from negative lead L8 (FIGURE 11B) through terminal 10 and terminals A of main terminal strip P4–J4** to speedometer circuitry illustrated in block diagram form in FIGURE 11C and labeled "speedometer." The speedometer circuitry, which is illustrated in detail in FIGURE 12 and which constitutes the major portion of the circuits illustrated in FIGURES 12A–12D, is not believed to require detailed description inasmuch as it is identical to the speedometer circuitry disclosed in copending application Serial No. 93,358 filed March 6, 1961, and since it forms no part of the present invention.

In general, it is the function of the speedometer circuitry to provide a voltage indicative of the speed of the simulated vehicle 200 taking into consideration the rate of acceleration or deceleration of the vehicle, the gear range (i.e., whether gearshift lever 204 is in first gear, second gear, etc.) and whether manual or automatic transmission simulation is being employed. The speedometer circuitry provides a speed indication on the speedometer M1 mounted in the simulated vehicle instrument panel 212. The speedometer circuitry also produces an output voltage on the slider of calibrating potentiometer R28 (FIGURES 11C and 12A) which is applied through terminal T of main terminal strip P4–J4 and terminal 12 to the negative side of the speed recording galvanometer coil **626*a* in recorder 600. The positive side of speed galvanometer coil 626*a* is connected to the main positive lead L2 through terminal 1. Consequently, as the simulator operator manipulates the control instrumentalities provided in the simulated vehicle 200 which, in a real vehicle, would result in a variation of the speed at which the vehicle was travelling, the speedometer circuitry provides a variable output voltage indicative of such speed which is reproduced in the speed galvanometer coil 626*a*. Coil 626*a*, in the manner described above, moves recording pen 622*a* to provide a record of the speed in the "speed" column of strip chart 616**.

Operating voltage is applied to the steering galvanometer coil **626*b* from the slider of a potentiometer R23 (FIGURES 11C and 12D) operably connected to steering wheel 202 in such a manner that, as steering wheel 202 is manipulated, the position of the slider of potentiometer R23 relative to its coil is altered to produce a varying output voltage. The potentiometer energizing circuit is from negative lead L8 through terminal 10, terminals A of main terminal strip P4–J4, calibrating potentiometer R30, potentiometer R23**, and terminals *a* of main terminal strip P4–J4 to positive lead L10. The output voltage from the potentiometer is applied through pins 1 of connector P14–J14 and terminals V of main terminal strip P4–J4 to the negative side of the steering galvanometer coil **626*b*. The positive side of the steering galvanometer coil is connected through terminal 1 to main positive lead L2**.

The variable voltage providing an indication of the operator's braking effort is applied to the negative side of the brake galvanometer coil **626*c* from the slider of a brake potentiometer R22 (FIGURES 11C and 12D) through pins 1 of connector P7–J7 and terminals W of main terminal strip P4–J4. The positive terminal of the brake galvanometer coil 626*c* is connected through terminal 1 to positive lead L2. The brake potentiometer R22 slider is operably connected to brake pedal 210 so that manipulations of the brake pedal will vary the position of the slider relative to the potentiometer coil, producing a variable potentiometer output voltage as the brake pedal is manipulated. An energizing circuit is provided for brake potentiometer R22 from positive lead L10 through terminals A of main terminal strip P4–J4, pins 12 of connector P7–J7, potentiometer R22, calibrating potentiometer R29, terminals A of main terminal strip P4–J4, and terminal 10 to negative lead L8**.

The positive terminals of the left and right directional signal solenoids **634*f* and 634*g* are connected through terminals 1 and 50 to positive lead L2. The negative terminal of the left directional signal solenoid 634*f* is connected through terminals 53 and 8, terminals 2 of main terminal strip P4–J4, pins 4 of connector P3–J3, and pins 4 of connector P10–J10 to contacts LT of directional switch S15** (FIGURES 11A and 12A). When the directional signal indicator is operated to signal for a left-hand turn, switch S15 is closed and the circuit is completed through the directional switch S15, its contacts LR, pins 1 of connector P10–J10, pins 7 of connector P3–J3, terminals A of main terminal strip P4–J4, and terminal 10 to negative lead L8, energizing solenoid 634*f*.

The negative terminal of the right directional indicator solenoid 634*g* is connected through terminals 54 and 9, pins *b* of main terminal strip P4–J4, pins 6 of connector P3–J3 and pins 2 of connector P10–J10 to contact RT of direction switch S15. When the directional signal indicator is operated to signal for a righthand turn, switch S15 is closed and the circuit through the right directional indicator solenoid 634*g* is completed to negative lead L8 by the circuit described above in conjunction with the left directional indicator, applying operating voltage to the right directional indicator solenoid 634*g* which is thereby energized.

Energization of either of the directional signal solenoids 634*f* or 634*g* pivots the associated pen arm 630*f* or 630*g*, causing the pen 622*f* (or 622*g*) carried on the arm to produce a record of directional signal operation in the left (or right) directional signal column of strip chart 616.

Normally, the initial portion of a test sequence film will present an uneventful road scene, for example, a straight stretch of road with no traffic signals or the like to provide the simulated vehicle operator an opportunity to adjust to the test conditions. During uneventful portions of the test sequence, the recorder 600 is, as was described above, operated at low speed since operating voltage is applied to its motor M2 through recorder 600 contacts 20 and C1. This is an important feature of the present invention since it greatly reduces the bulk of the record chart produced by recorder 600, compressing the record produced during the uneventful stretches of the road scene onto a much shorter segment of strip chart 616 than would be required if the recorder were operated at the speed necessary to provide the degree of resolution required during a test incident.

Simulator operation during a test incident sequence is controlled by the event switch S7 (FIGURES 11B and 12A) which is opened and closed by a series of four notches 1, 2, 3 and 4 formed in the edge of the film moving through projector 400 (see FIGURE 10). The operation of the simulator circuitry during the test sequence will be described primarily with reference to FIGURE 11 and FIGURE 10.

As is shown in FIGURE 10, an exemplary test incident may present a scene in which the simulated vehicle rounds a curve and encounters a boulder in the road. The correct response to this incident is to jam on the brakes and rapidly decrease the speed of the simulated vehicle and thereafter maneuver it along the path indicated by the dashed arrows in FIGURE 10 to avoid the boulder. FIGURE 10 correlates the projected scene with the film notches 1–4, the conditions of the relays K6, K7 and K8 and the circuitry operation. In this figure, the number "0" is employed to designate a de-energized relay and the numeral "1" is employed to designate an energized relay.

Prior to the initiation of a test incident, event switch S7 is in its NO position and relays K6, K7 and K8 are all de-energized as illustrated in FIGURES 11B and 12F.

As the film travels through the projector, presenting the developing test incident to the driver, film notch number 1 arrives at the event switch S7 which drops into the notch, transferring from contact NO to contact NC. This completes a circuit from the negative lead L8 through the event switch, its contact NC, pins 1 of connector P1–J1 and 7 of connector P9–J9, now negative lead L11, contacts 7 and 9 of relay K7, contacts 10 and 12 of relay K8, relay K6 and resistor R–25 to the main positive lead L2, energizing relay K6. The energization of relay K6 is effective (1) to increase the speed of the two-speed strip chart recorder 600 and (2) to apply voltage to the solenoid of stepper switch S16. In addition, energization of relay K6 closes its contacts 1 and 3 to provide a holding circuit from positive lead L2 through resistor R25, relay K6 and relay contacts 1 and 3 to negative lead L8. This circuit retains relay K6 energized when event switch S7 transfers to its contact NO as it rides out of film notch NO 1.

The speed of recorder 600 is increased by applying voltage to terminal C of the recorder (see FIGURE 11B). The circuit provided for this purpose leads from main power plug J11 through main fuse F1, main switch S2, terminal 39, contacts 7 and 8 of relay K1, terminal 40, hold switch S3, contacts 13 and 14 of relay K6 and terminal 15.

Referring now to FIGURE 9, terminal C is connected to one side of a solenoid K10 incorporated in recorder 600. The other side of relay K10 is connected through lead L10 to the other side of plug J11 (not shown in FIGURE 9). Completion of the foregoing circuit energizes relay K10, opening relay K10 contacts 1 and 3 and closing its contacts 2 and 3. The 115 volt operating voltage at recorder contact C′ is thereby applied to terminal H of motor M2, increasing its speed to provide the increased resolution of the recordings on strip chart 616 which is required during a test incident.

Contact 3 is normally biased as by a spring (not shown) into engagement with contact 1 so that, when relay K10 is subsequently de-energized at the end of the test incident, recorder 600 will be restored to low speed operation.

Voltage is applied to the solenoid of stepper switch S16 by a circuit from main positive lead L2 through the stepper switch S16 solenoid, contacts 11 and 10 of relay K6, and contacts 18 and 16 of relay K8 to negative lead L8. Stepper switch S16, as is conventional, is conditioned by the application of voltage to its solenoid and stepped by the subsequent removal of the conditioning voltage.

The event switch S7 subsequently travels out of film notch number 1, transferring to its contacts NO, as shown in FIGURE 11B. Relay K6 will remain energized through the above-described holding circuit provided through its contacts 1 and 3. Therefore, transfer of event switch S7 to contact NO completes a circuit from negative lead L8 through switch S7, its contact NO, pins 6 of connector P6–J6 and 14 of connector P9–J9, now negative lead L12, contacts 4 and 5 of relay K6, contacts 4 and 6 of relay K8, relay K7, and resistor R26 to positive lead L2, energizing relay K7. Energization of relay K7 closes its contacts 1 and 2, providing a holding circuit from positive lead L2 through resistor R26, relay K7, and its contacts 1 and 2 to negative line L8. As is shown in FIGURE 10, relays K6 and K7 are energized at this point and relay K8 is de-energized.

The arrival of film notch number 2 at event switch S7 will again transfer the latter from contact NO to contact NC. This connects negative lead L8 through event switch S7 and its contact NC, lead L11, the now closed contacts 7 and 8 of energized relay K7 and contacts 7 and 9 of de-energized relay K8 to terminal A of relay K6. Since relay K6 terminal B is connected through relay K6 contacts 1 and 3 to lead L8, a zero voltage drop exists across relay K6, thereby de-energizing it. De-energization of relay K6 (1) removes the voltage previously applied to the coil of stepper switch S16 and (2) conditions a circuit which may subsequently be completed to energize relay K5.

As was pointed out above, stepper switch S16 is constructed so that removal of voltage from its solenoid causes it to advance or step to the next higher numbered of its contacts. Thus, in the test incident illustrated in FIGURE 10, the stepper switch advances from contact 5 to contact 6 when event switch S7 drops into film notch 2. The stepping of switch S16 to contact 6 connects positive lead L2 through relay K5, stepper switch S16, its contact 6, pins 6 and 20 of programming plug P13–J13, terminal 30, and pins 6 of connector P7–J7 to contacts H*d* of brake switch S13. This conditions circuitry which will be described in detail presently. If the vehicle operator responds correctly to the exemplary test incident by applying his brakes vigorously, the conditioned circuit will be completed, energizing relay K5 to extinguish the projector lamp 402 and prevent a starburst sequence which, as discussed above is indicative of an improper response, from being projected.

The programming plug P12–P13, which may have regular pin and socket type connections, provides automatic connection of selected stepper switch contacts to the contacts of the switches operated by the vehicle controls as, for example, the brake switch S16 illustrated in FIGURES 11A and 12D. Selected circuits are thereby automatically conditioned coincidental with the arrival of stepper switch S16 at a particular contact. The sequence of conditioned circuits may be quickly and readily varied to coincide with various test sequences merely by interchanging the readily replaceable programming plugs.

Returning again to the operating sequence, the event switch S7, upon exiting from film notch number 2, will again switch to contact NO as shown in FIGURE 11B, connecting negative lead L8 to lead L12, completing a circuit through contacts 4 and 6 of de-energized relay K6, contacts 4 and 5 of energized relay K7, relay K8, and resistor R27 to positive lead L2, energizing relay K8. Relay K8 is locked closed through a holding circuit from negative lead L8 through relay K8 contacts 2 and 1, relay K8, and resistor R27 to positive lead L2. At this point (see FIGURE 10) relay K6 is de-energized and relays K7 and K8 are energized, providing locking voltage for relay K5 from the negative lead L8 through contacts 7 and 9 of de-energizing relay K6, contacts 10 and 11 of energized relay K7, terminal 28, terminals *d* of main terminal strip P4–J4, and pins of connector P7–J7 to brake switch S13. Thus, if the simulated vehicle operator thereafter properly responds to the obstacle in his path by vigorously depressing brake pedal 210 to close brake switch S13 with its contact H*d*, relay K5 will be energized to extinguish the lamp 412 of projector 52 and prevent a starburst.

Upon the arrival of film notch number 3, the event switch S7 is again closed with its contact NC, connecting negative lead L8 through lead L11, contacts 7 and 8 of energized relay K7, contacts 7 and 8 of energized relay K8, relay K6, and resistor R25 to positive lead L2, energizing relay K6. At this point (see FIGURE 10) all three of the relays K6, K7 and K8 are energized. If, prior to the arrival of film notch number 3, the vehicle operator took the proper corrective action by vigorously depressing brake pedal 210 so that brake switch S13 closed with its contact H*d*, relay K5 will have been energized through the circuit described above and will have been locked close by a holding circuit from the positive lead L2 through relay K5, its contacts 2 and 1, and contacts 17 and 16 of relay K8 to negative lead L8. If relay K5 is energized by the driver's proper corrective action, projector lamp 412 is extinguished since energization of relay K5 opens its contacts 4 and 6, interrupting the circuit to the projector lamp.

If corrective action has not been taken prior to the arrival of notch number 3, relay K5 cannot thereafter be energized because energization of relay K6 opens its contacts 7 and 9, interrupting the above-described relay K5 energizing circuit. Contacts 4 and 6 of the relay K6 will therefore remain closed, projector lamp 412 will remain on, and the starburst sequence will be displayed upon screen 500, visually impressing upon the simultator operator his failure to take proper corrective action.

As was discussed above, a permanent record of starbursts is produced on strip chart 616 by marking pen 622*e* which is activated by solenoid 634*e*. If the driver does not respond correctly to a test incident, solenoid 634*e* is momentarily energized, pivoting the arm 630*e* on which the pen 622*e* is carried, causing the latter to produce a pip 638 in the starburst column of the chart. Energizing voltage is applied to solenoid 634*e* through a circuit in which the contacts 1 and 2 of relay K5*a* are serially interposed. These contacts are normally open, but are closed by the energization of relay K5*a* if the operator does not take timely corrective action.

Energizing power is applied to relay K5*a* when event switch S7 emerges from film notch number 3 if relay K5 has not theretofore been locked closed (it will be remembered that, if relay K5 has been locked closed its contacts 4 and 6 will be open, preventing relay K5*a* from being energized). The passage of notch number 3 transfers event switch S7 from contact NC to contact NO, completing a circuit from negative lead L8 through lead L12, relay K5 contacts 4 and 5, and relay K8 contacts 4 and 5 to terminal A of relay K7. Since the opposite terminal B of relay K7 is connected through its contacts 1 and 2 to negative lead L8, and since leads L8 and L12 are at the same negative potential, the voltage drop across relay K7 is reduced to zero, de-energizing it.

The energizing circuit of relay K5*a*, completed at this point if relay K5 has not been energized, is from negative lead L8 through contacts 16 and 17 of energized relay K8, contacts 1 and 3 of de-energized relay K10 and relay K5*a* to positive lead L2. Energization of relay K5*a* establishes a circuit to the starburst solenoid 634*e* in recorder 600 from negative lead L8 through contacts 7 and 8 of energized relay K6, contacts 13 and 14 of energized relay K8, contacts 1 and 2 of energized relay K5*a*, recorder terminal 55, starburst solenoid 634*e*, recorder terminal 52, and terminal 1 to positive lead L2, energizing solenoid 634*e* to produce a pip 638 as described above.

Film notch number 4 is timed to arrive at event switch S7 at the end of the starburst display which follows the associated test incident. Notch number 4, like notches 1–3, causes switch S7 to close with its contacts NC. This completes a circuit from negative lead L8 through lead L11, contacts 7 and 9 of de-energized relay K7, and contacts 10 and 11 of energized relay K8 to terminal A of the coil of relay K6. This circuit reduces the potential across relay K6 to zero since its other terminal B is also connected (through its contacts 1 and 3) to negative line L8, de-energizing the relay. De-energization of relay K6 opens its contacts 13 and 14, interrupting the circuit to terminal C of recorder 56, thereby de-energizing relay K10 and closing its contacts 1 and 3 to apply the operating voltage on recorder terminal C′ to the low speed terminal L of recorder motor M2. Recorder 600 will thereafter again operate at low speed, operating voltage being applied through the low-speed circuit previously described.

When film notch number 4 passes, event switch S7 will again close with its contact NO, connecting negative lead L8 through lead L12, contacts 4 and 6 of de-energized relay K6 and contacts 4 and 6 of relay K7 to terminal A of relay K8. Since the opposite terminal B of relay K8 is connected through its contacts 1 and 2 to negative line L8, this reduces the potential across relay K8 to zero, de-energizing it. At this point (see FIGURE 10) all three relays K6, K7 and K8 are de-energized and the simulator circuits are in the condition shown in FIGURES 11A–D. The circuits will remain in this condition until the arrival of a further sequence of four film notches associated with a further test incident whereupon the test cycle described above will be repeated.

A further feature of the present invention is the hold switch S3 (see FIGURES 11C and 12F). Opening of hold switch S3 interrupts two circuits. The first of these is the 115-volt alternating current circuit from the hold switch through terminal 11, terminals C of main terminal strip P4–J4, pins 7 of connector P2–J2, accelerator autotransformer T2, pins 9 of connector P2–J2, pins E of main terminal strip P4–J4 and terminal 29 to projector rectifier CR5–CR8. Interruption of this circuit removes operating voltage from the motor M of the projector which therefore stops. The second circuit interrupted is the 115-volt alternating current circuit through the hold switch and terminal 25 to recorder terminal C' (which, it will be remembered, furnishes operating voltage to the recorder motor M2) which stops the recorder. The effect of opening hold switch S3, therefore, is to shut down projector 400 and recorder 600. This allows the instructor to, in the middle of a test sequence, hold the test for as long as may be necessary to impart further instructions or other information to the simulator operator. The opening of hold switch S3 has no effect on main transformer T1 and main relay K1 will therefore remain energized. Thus, when the instructor again closes hold switch S3 to resume the test, the simulator circuitry will not recycle to the start-up sequence described above, but the test will continue from the point where it was interrupted.

*Simulated vehicle*

Figure 1A:
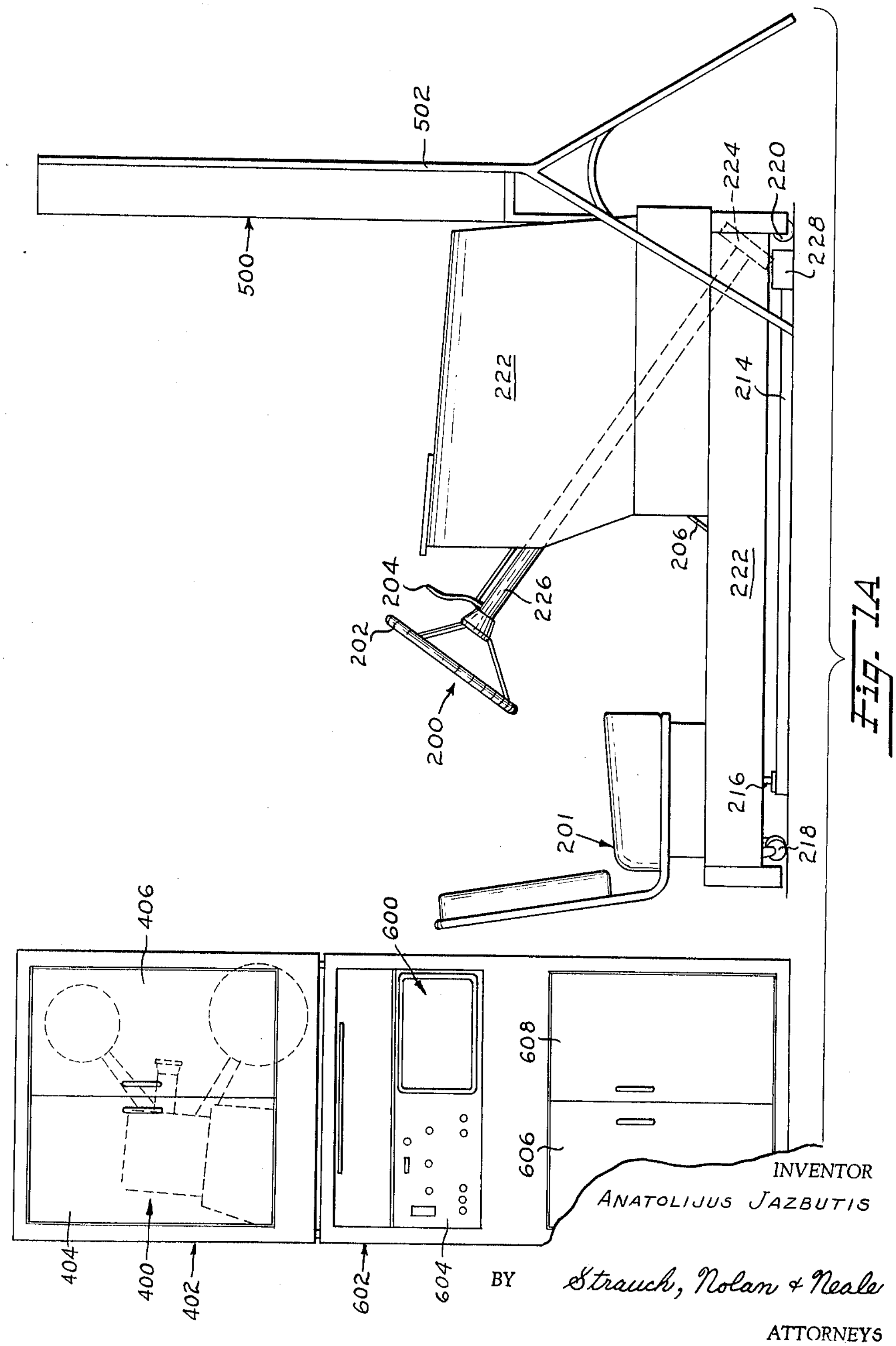
FIGURE 1A is a side elevation of the simulator of FIGURE 1.
Figure 2:
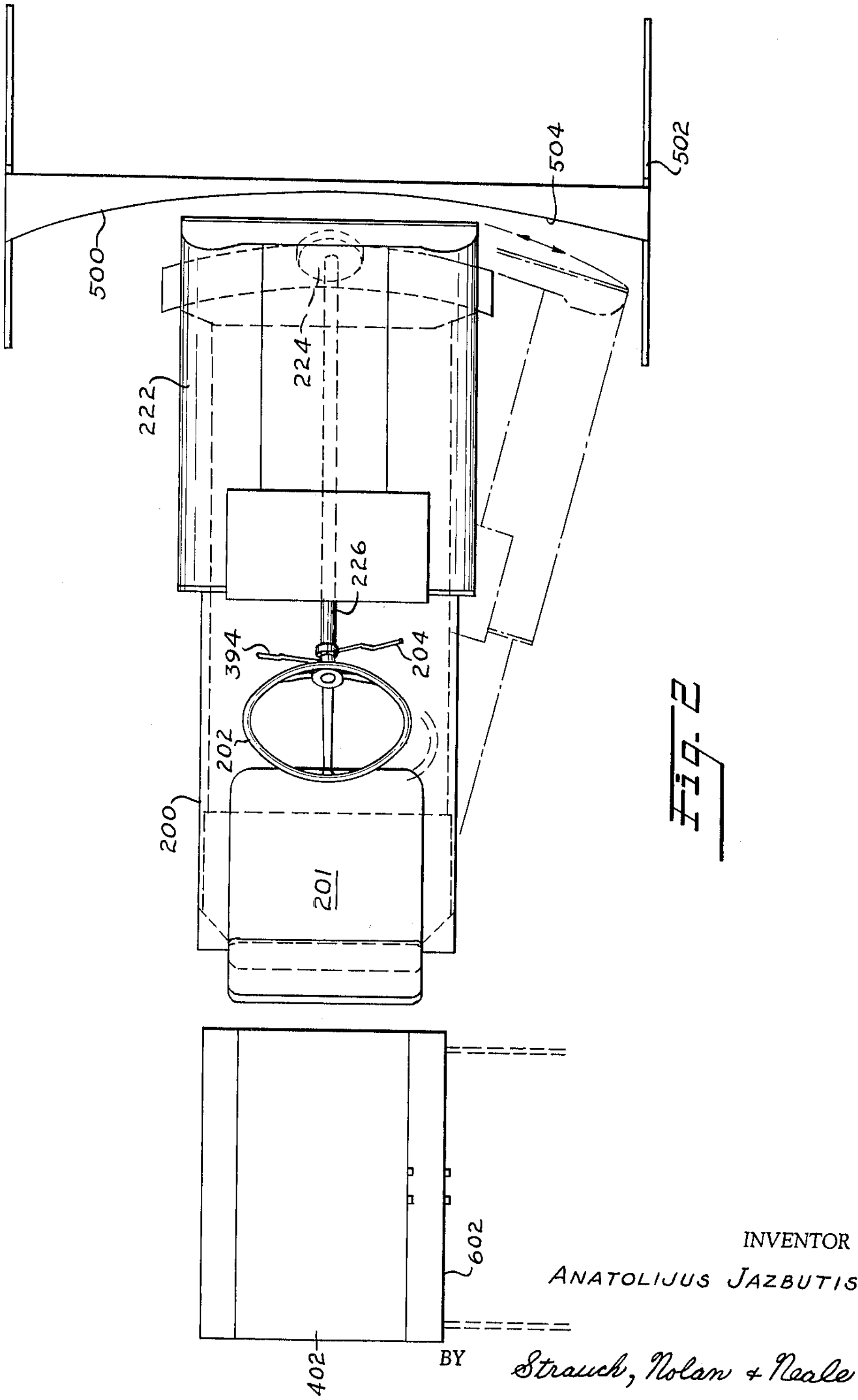
FIGURE 2 is a top plan view of the simulator.
Figure 3:
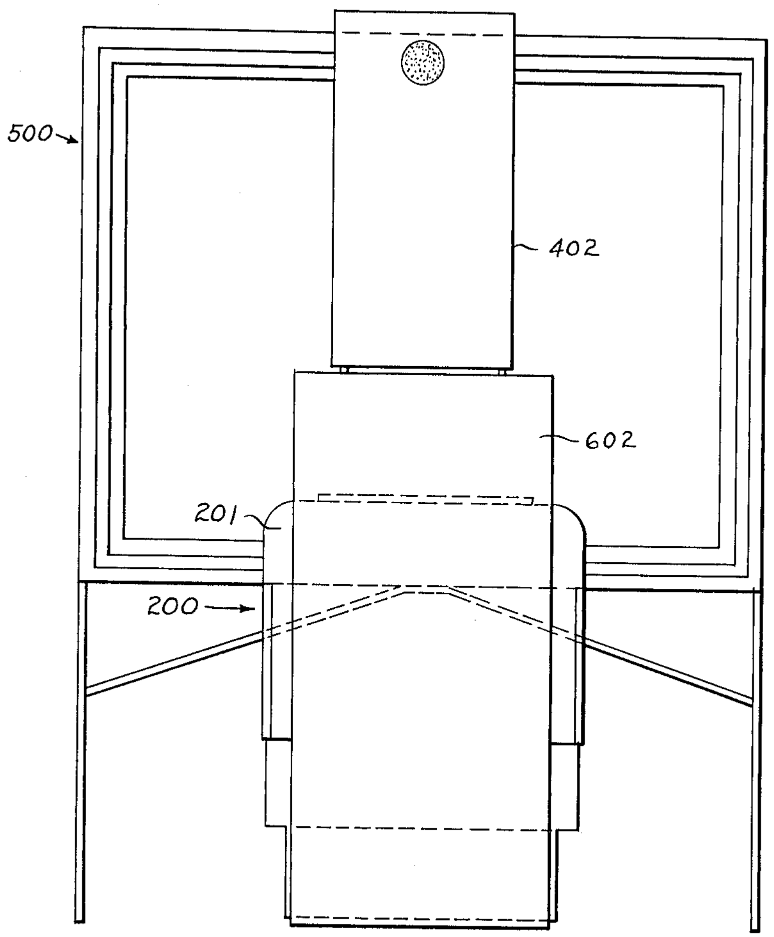
FIGURE 3 is a rear end view of the simulator.
Figure 4:
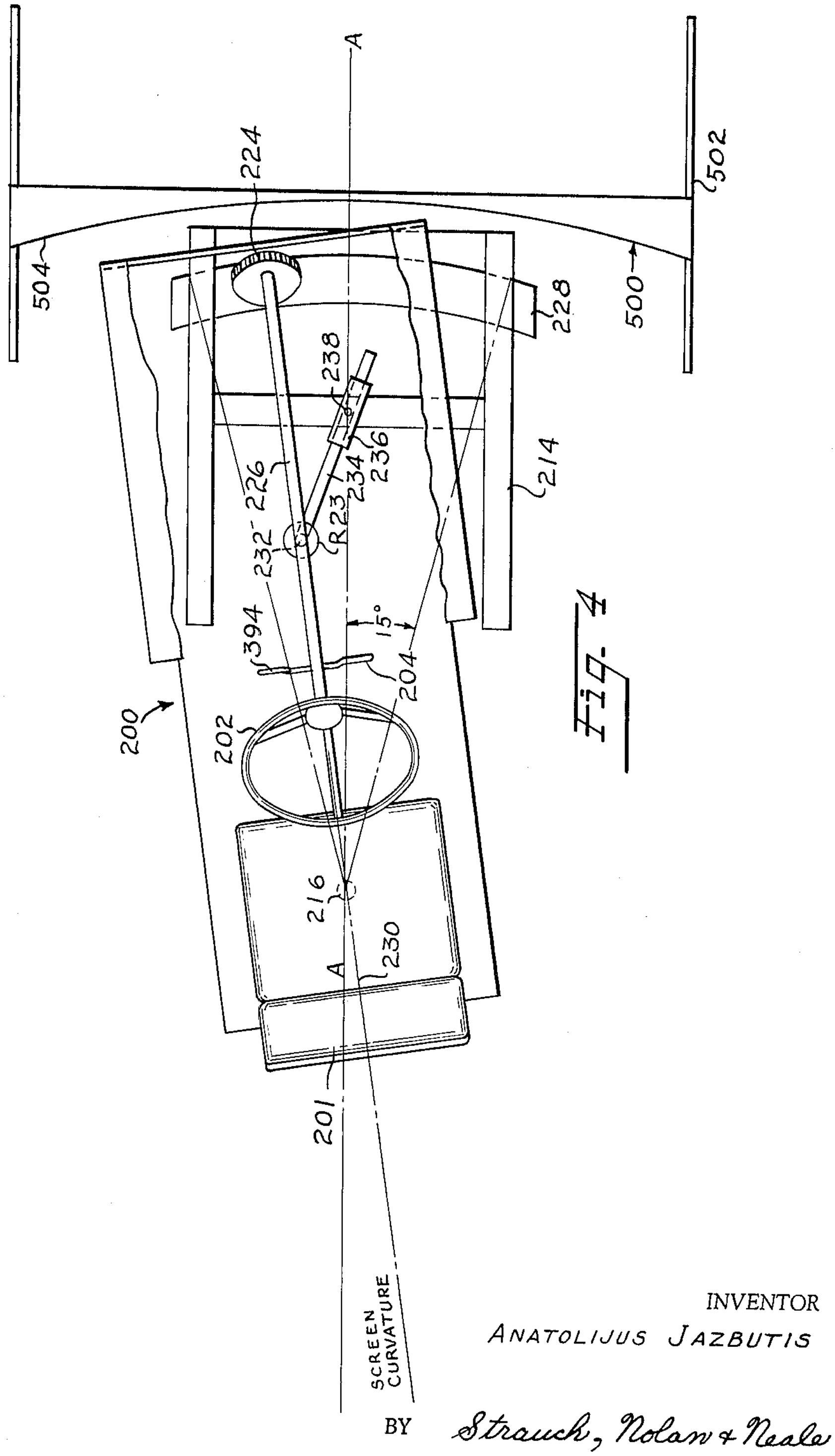
FIGURE 4 is a schematic top plan view of a simulated automotive vehicle and screen employed in the simulator, illustrating the automobile's steering linkage and steering sensing mechanism.

Referring now to FIGURES 1, 2 and 4, simulated vehicle 200 is, as was pointed out above, pivotally mounted on a base 214 so that, as the simulator operator manipulates steering wheel 202, vehicle 200 will pivot substantially in the manner of a real automobile, increasing the sensation of realism experienced by the simulator operator. Referring now specifically to FIGURE 1A, vehicle 200 is pivotally mounted on a pivot post 216 which extends upwardly from base 214 at a point which is substantially coincidental with the center of the operator's seat 201. Casters 218 and 220, fixed to the bottom of the body 222 of the simulated vehicle, support the vehicle 200 as it pivots about post 216. Although but two casters are shown, it is to be understood that normally four such casters would be employed, one at each of the four corners of the vehicle. The casters are of conventional construction and may be attached to the vehicle body 222 in any desired manner, as, for example, by bolts (not shown).

To effect pivotal movement of vehicle 200 about pivot post 216, a friction wheel 224 is fixed to the lower end of the steering column 226. Friction wheel 224 engages an arcuate track 228 incorporated in the vehicle base 214. Thus, as steering wheel 202 is rotated by the simulator operator, friction wheel 224 rolls in an arcuate path along track 228. Suitable stops (not shown) are preferably provided to limit pivotal movement of the vehicle body to about 15° on either side of the normal or "dead ahead" position in which the center line 230 of vehicle body 222 is coincidental with line A—A.

Because of the friction wheel arrangement, continued movement of steering wheel 202 when vehicle 200 is in one of the extreme positions will merely result in friction wheel 224 slipping on track 228. Unlike a positive drive system, therefore, undue rotation of steering wheel 202 will not damage simulated vehicle 200.

In the prior art simulated vehicle operators, wherein the simulated vehicle body is fixed, steering indications are provided from variable potentiometers or similar devices which are responsive to manipulations of the simulated vehicle steering wheel. An exemplary system of this type is illustrated in the Chedister et al. patent referred to above. In the simulated vehicle 200 of the present invention, vehicle position rather than steering wheel position is sensed to provide a more reliable indication of the simulator operator's steering ability.

Referring now to FIGURES 4, 11C and 12D, the variable voltage applied to steering galvanometer coil **626*b* in recorder 600 is provided by potentiometer R23 which is connected to coil 626*b* through the circuits described above. Referring specifically to FIGURE 4, the slider of potentiometer R23 is fixed in the conventional manner to a rotary or pivotal potentiometer shaft 232 so that, as the potentiometer shaft 232 is rotated, the position of the potentiometer slide is varied relative to the potentiometer coil, producing a variable output voltage. To correlate the potentiometer slide output voltage to the position of simulated automobile 200, an elongated rod-like member 234 is fixed to rotary potentiometer shaft 232. Rod 234 is slidably disposed in a sleeve 236 which is pivotally attached to the vehicle body as by a pivot stud 238. Consequently, as simulated vehicle 200 is displaced from its normal position, rod 234 slides into sleeve 236 which pivots freely about pivot stud 238 to rotate potentiometer shaft 232** and thereby provide a varying output voltage.

The above-described mechanism for varying the output voltage of steering potentiometer R23 is one of the important features of the present invention. This mechanism correlates the output voltage of the potentiometer to car position rather than to steering wheel manipulation as in the prior art devices. Consequently, continued rotation of steering wheel 202 after simulated vehicle 200 has been pivoted to either of its extreme positions will not produce an output voltage indicative of vehicle movement beyond these positions. Additionally, the preferred mechanism provides increased sensitivity for steering wheel manipulations when simulated vehicle 200 is near its normal, straight ahead position and decreased sensitivity as the vehicle approaches one or the other of its extreme positions.

This is advantageous in testing the simulator operator's ability to control the simulated vehicle 200. For example, in a test designed to determine the operator's ability to maintain the vehicle in a traffic lane, increased sensitivity is required since it is desirable to detect relatively small deviations from the proper path. On the other hand, if the test merely requires turning the vehicle around so that a large turning effort is required, but its precise magnitude is not important, less sensitivity is required. Since a larger turning effort will pivot simulated vehicle 200 to or near an extreme position, less sensitivity will be provided. The foregoing arrangement permits steering reactions to be recorded in a much narrower column of strip chart 616 than would be required if steering potentiometer R23 were linearly responsive to deviations of simulated vehicle 200 from its straight ahead position.

It is a further feature of the simulator provided by the present invention that the control instrumentalities such as the potentiometer R23 controlled by steering wheel 202 can be readily connected, both electrically and mechanically, to simulated vehicle 200. All of the electrical connections to steering potentiometer R23 and steering switch S17 are made through a plug-jack connector P14–J14 (see FIGURE 12D). Jack J14 is preferably mounted on a junction panel (not shown) mounted within the simulated vehicle body 222 in front of instrument panel 212. Plug P14 is connected as shown in FIGURE 12D to potentiometer R23 and switch S17 which, together with rod 234, form a unit that may be assembled by slipping rod 234 into sleeve 236 and bolting the unit to the vehicle body 222 by suitable bolts or the like (not shown). All of the necessary electrical connections may then be made by plugging plug P14 into jack J14.

Figure 5:
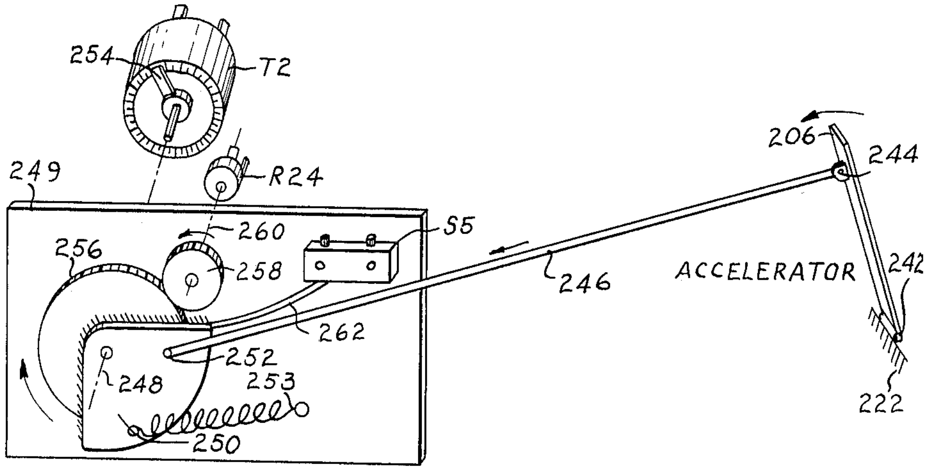
FIGURE 5 is a diagrammatic illustration of the automobile's accelerator pedal and accelerator sensing mechanism.

As was pointed out above, depression of accelerator pedal 206 varies the output voltage of accelerator autotransformer T2 to vary the projection speed of projector 600 and to vary the output voltage of potentiometer R24 and, consequently, the voltage applied to speed galvanometer coil **626*a* which moves a recording pen 622*a* to produce a permanent record of the speed at which the operator drives the simulated vehicle through the test sequence. The mechanism operatively connecting accelerator pedal 206 to accelerator autotransformer T2 and to potentiometer R24 is shown in FIGURE 5. Accelerator 206 is of conventional design and is pivoted to the vehicle body 222 as at 242. Fixed to the free end of accelerator pedal 206 as by a pin 244 is an elongated control shaft 246. Control shaft 246 converts pivotal movement of accelerator pedal 206** into pivoting or rocking movement of a shaft 248 rockably mounted in suitable bearings (not shown) in a bracket 249. Control shaft 246 is connected to rockable shaft 248 by an arcuate segment 250 fixed to shaft 248 and pivotally connected to control shaft 246 by a pivot pin 252. Thus, pivotal movement of accelerator pedal 206 by the simulator operator is effective to pivot segment 250 and shaft 248. A spring 253, connected at one end to segment 250 and at the other to bracket 249, biases accelerator pedal 206 to its normal inoperative position.

The slider or output arm 254 of autotransformer T2 is fixed to shaft 248. Therefore, rotation or pivotal movement of shaft 248 is effective to move output arm 254, producing a variable voltage which, as described above, is applied to the projector rectifier CR5–CR8 to vary the projection speed as the simulator operator manipulates the accelerator pedal 206.

Also fixed on shaft 248 is a spur gear 256 which meshes with a pinion 258 fixed on a shaft 260 which is, like shaft 248, supported in bracket 249 in suitable bearings (not shown). Shaft 260 is the output shaft of an accelerator potentiometer R24 (see FIGURE 12C). Thus, manipulation of accelerator pedal 206 is effective to rotate potentiometer R24 output shaft 260 to provide a varying potentiometer output voltage correlated to manipulation of the accelerator pedal. This output voltage is modified by the speedometer circuitry illustrated in FIGURES 12A–12C and described in detail in copending application No. 93,538 referred to above, to apply a variable voltage to the speed galvanometer coil 626*a* in recorder 600.

Also mounted on bracket 249 is a microswitch S5 (see also FIGURE 12C) provided with an actuator 262 which is operated to close switch S5 to its contacts NC when accelerator pedal 206 is depressed. As is explained in detail in the copending application referred to above, this conditions circuits in the speedometer circuitry to provide an accurate indication of the operator's handling of the simulated vehicle 200 while the latter is undergoing simulated acceleration. If desired, the copending application may be referred for a detailed description of the acceleration switch S5 and the circuits in which it is connected. Since the speedometer circuitry per se forms no part of the present invention, however, and since it is described in detail in the copending application, repetition of this disclosed is not believed to be necessary herein.

Bracket 249 and the components supported by it form a speed unit which may readily be assembled in the simulated vehicle 200 by bolting bracket 249 to vehicle body 222. All of the connections to the electrical components in this unit (accelerator autotransformer T2, speed potentiometer R24 and switch S5), are made by plug-jack connector P2–J2 (see FIGURE 12C). Plug P2 is incorporated in the speed unit and jack J2 is mounted on the junction panel in the vehicle body. After the speed unit bracket 249 has been bolted to the vehicle body, the electrical connections may be quickly made by plugging plug P2 into jack J2.

As was described above, the depression of brake pedal 210 by the simulator operator has two functions. First, it varies the output of the potentiometer R22 to, as described above, apply a variable voltage to brake galvanometer coil 626*c* in recorder 600 to provide a record of the manner in which the operator manipulates brake pedal 210 in response to stimuli presented to him by the scene on screen 500. Secondly, depression of brake pedal 210, in response to certain stimuli presented to the operator, will, if the response is correct, close brake switch S13 to complete a circuit to relay K5 (see FIGURE 11B) to, eventually, darken projector 400 and prevent the "starburst" scene from being displayed at then end of the test incident sequence.

Figure 6:
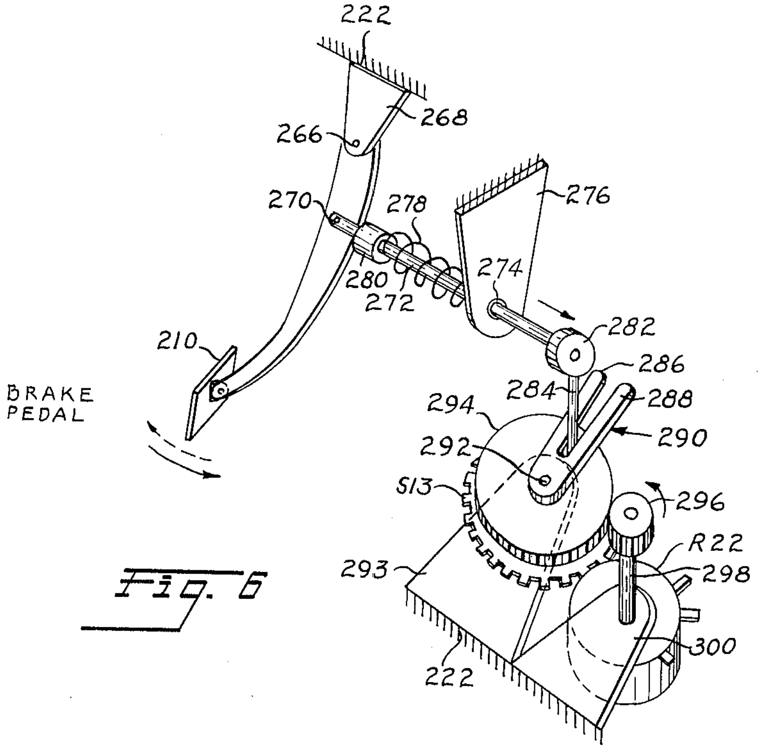
FIGURE 6 is a diagrammatic illustration of the automobile's brake pedal and brake sensing mechanism.

The linkage by which brake pedal 210 is connected to potentiometer R22 and brake switch S13 is shown in FIGURE 6. Brake pedal 210 is pivotally mounted by a pivot pin 266 on a bracket 268 fixed to the simulated vehicle body 222. Pivotally fixed to brake pedal 210 intermediate its ends by a pivot pin 270 is a reciprocable control 272 which extends through a grommet 274 fixed in a bracket 276 which, in turn, is mounted in any appropriate manner on the vehicle body 222. A spring 278 journalled on control rod 272 and extending between bracket 276 and a stop 280 fixed to the control rod in any suitable manner biases brake pedal 210 in a clockwise direction (the direction of the dotted arrow in FIGURE 6) to its normal, inoperative position. A stop of appropriate design (not shown) may be employed if desired, to limit the clockwise movement.

Connected to the end of control rod 272 opposite brake pedal 210, by a connecting member 282, is a depending pin-type operator 284. Pin 284 is surrounded by the arms 286 and 288 of a bifurcated crank 290 fixed by a rotatably mounted shaft 292 to switch arm A (see FIGURES 11A and 12B) of brake switch S13 which is mounted on a vehicle body 222 by a bracket 293. Thus, if pedal 210 is depressed (to rotate it in the direction of the solid arrow in FIGURE 6) to the proper degree in response to a test stimulus), control rod 272 will be moved in the direction indicated by the arrow in FIGURE 6, rotating switch arm A (not shown in FIGURE 6) into engagement with one of the brake switch S13 contacts M, H or S to complete the circuit to relay K5, thereby extinguishing the lamp of projector 400, as described above.

Also fixed to shaft 292 is a spur gear 294 which meshes with a pinion 296 fixed to a shaft 298 rotatably mounted in suitable bearings (not shown) in an arm 300 of bracket 293. Shaft 298 is connected to the slide (not shown in FIGURE 6) of potentiometer R22. Thus, manipulation of brake pedal 210 rotates the potentiometer R22 output shaft 298, varying the position of its slide relative to its coil. This produces a varying output voltage which is applied to brake galvanometer coil 626*c* in recorder 600, providing a record on strip chart 616 of the simulator operator's braking efforts.

Bracket 293 and the components mounted on it provide a braket unit which is readily assembled in the simulated vehicle 200 by sliding the arms 286 and 288 of bifurcated crank 290 over operator 284 and bolting bracket 293 in vehicle body 222. The electrical connections to brake potentiometer R22 and brake switch S13 are all made through plug-jack connector P7–J7. Jack J7 is mounted on the junction panel in vehicle body 222 and plug P7 is incorporated in the brake unit. After the braket unit is bolted in place, all of the electrical connections are quickly and simultaneously made by plugging plug P7 into jack J7.

Figures 7, 8:
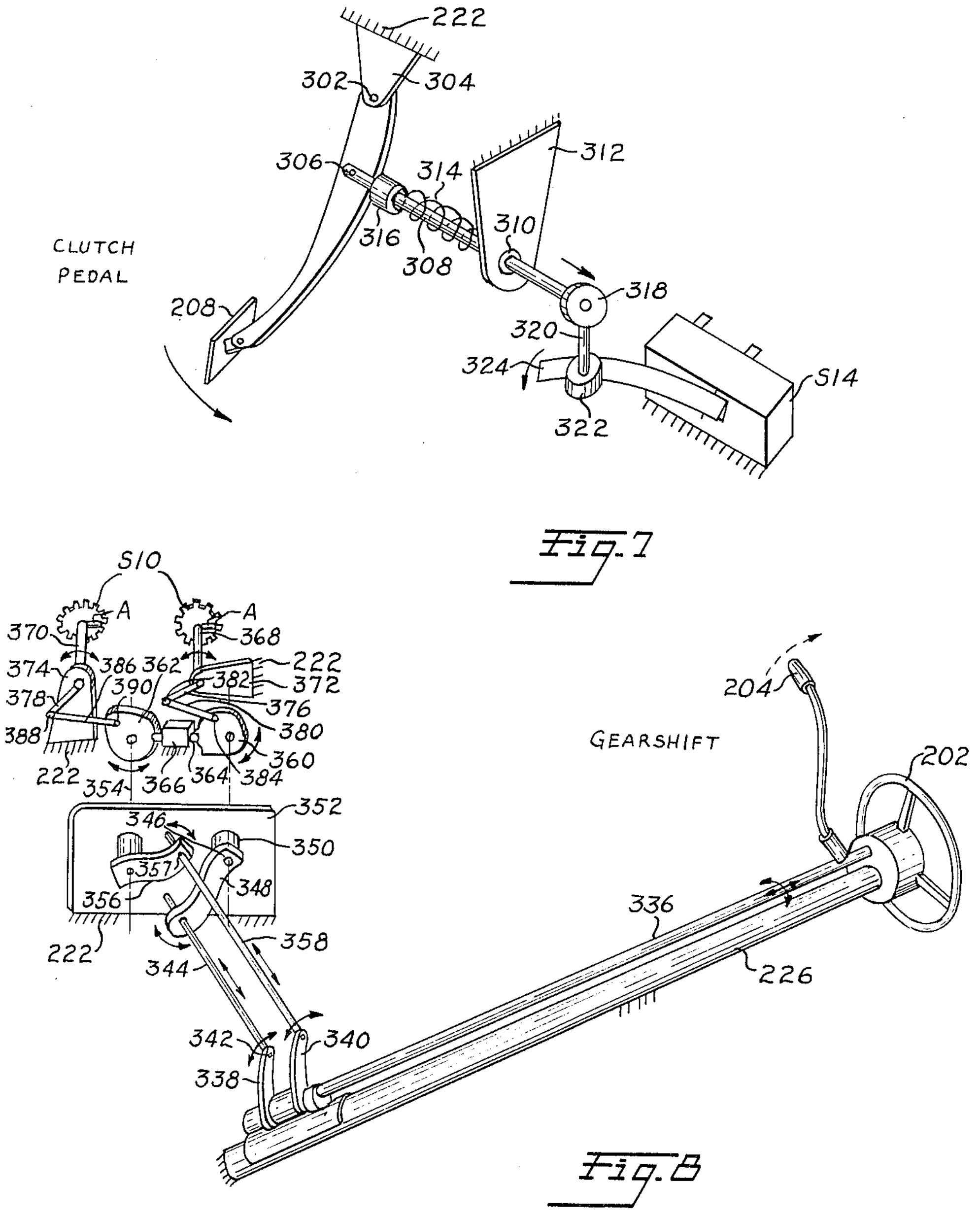
FIGURE 7 is a diagrammatic illustration of the automobile's clutch and clutch pedal position sensing mechanism.
FIGURE 8 is a diagrammatic illustration of the automobile's gear shift and gearshift position sensing mechanism.

As was described in detail above, clutch pedal 208 is connected to a clutch switch S14 so connected in the simulator's circuits that, if the simulated vehicle 200 is arranged to simulate manual transmission operation and the simulator operator fails to depress clutch pedal 208 while shifting gears, switch S14 will be open, interrupting the supply of voltage to relay K1 and closing down the entire simulator to impress upon the mind of the simulator operator that he has failed to manipulate the simulated vehicle controls in the correct manner. The linkage between clutch switch S14 and clutch pedal 208 is illustrated in FIGURE 7.

Clutch pedal 208 is pivotally connected by a pin 302 to a bracket 304 fixed to the vehicle body 222. Pivotally fixed in the intermediate portion of clutch pedal 208 by a pin 306 is a control rod 308 which extends through a grommet 310 fixed in a bracket 312 attached to the vehicle body. A coil spring 314, surrounding control rod 308, extends between bracket 312 and a stop 316 secured to the control rod in any suitable manner and biases clutch pedal 208 in a clockwise direction to its normal, inoperative position. An appropriate stop (not shown) may be employed, if desired, to limit the clockwise travel of clutch pedal 208 to the inoperative position. Operatively connected to the end of control rod 308 opposite clutch pedal 208 as by a connecting member 318 is a depending control pin 320.

Fastened on the lower end of control pin 320 is an abutment member 322 which engages the actuator 324 of clutch switch S14. Depression of clutch pedal 208 permits the actuator of clutch switch S14 to move away from the switch housing, thereby closing the switch with its contacts NC (see FIGURE 11C) during shifting of gears to prevent the simulator from being shut down. Assembly of clutch switch S14 into the simulated vehicle is facilitated because there are no connections to be completed between its actuator 324 and the clutch-operated abutment member 322.

As is shown in FIGURES 11C, 12B, and 12C, automatic transmission switch S12 and manual transmission switch S10 are multi-contact switches, different contacts being closed by the associated switch arms as the simulator operator simulates the shifting of gears by the manipulation of gear shift lever 204 which is mounted on steering column 226 (see FIGURE 1A) in the conventional manner. As is explained in detail in copending application 93,538, referred to above, switches S10 and S12 comprise part of the speedometer circuitry (shown in FIGURES 12A–12C and in block diagram form in FIGURE 11C). Thus, assuming the simulated vehicle 200 is programed for manual transmission simulation, manipulation of gear shift lever 204 to shift from neutral to first gear, causes the switch arms of manual gear switch S10 transfer from contacts N to contacts 1st. The function of gear switches S10 and S12 is described in detail in the copending application referred to above and is not believed to require elaboration herein since the speedometer circuitry in which these switches are incorporated forms no part of the present invention.

The linkage connecting gearshift lever 204 to gear switch S10 is illustrated in FIGURE 8. In this figure only one switch arm of each of the two segments of switch S10 is shown to avoid confusion and because the remaining switch arms are identical. Gearshift lever 204 is of conventional construction and is mounted in the conventional manner on the steering column 226. Again, as is conventional, it may be moved through a path corresponding to the letter H to simulate shifting from neutral to first, second, and third gears and into reverse. For example, the simulator operator, if the scene presented on screen 500 requires him to shift into reverse gear, pulls gear shift lever 204 toward his body and then rotates it in the direction shown by the dotted arrow in FIGURE 8. Similar conventional motions are made to shift the simulated vehicle into the remaining gears. Gearshift lever 204 is connected through a conventional ball and socket connection to a control rod (not shown) disposed in an elongated, hollow cylindrical housing 336. At its lower end, the control rod is selectively engageable with one of a pair of pivotally mounted cranks 338 or 340. Thus, when the simulator operator pulls gearshift lever 204 toward his body to shift into low or reverse gears from neutral, the gearshift lever actuated control rod in housing 336 is fixed to pivotal crank 340. Similarly, when gear lever 204 is moved away from the operator's body to shift the simulated vehicle from neutral into second (intermediate) or third (high) gear, the gear lever operated control rod is operatively connected to crank 338. Since the nature of the connection between the control rod and the cranks 338 and 340 forms no part of the present invention and may be of any desired construction, it has been omitted for the sake of clarity and to lessen confusion.

Crank 338 is pivotally connected by a pivot pin 342 to a reciprocable rod 344 which is fixed to the end of crank 338 and 340 forms no part of the present invention and fixed by a pivot member 346 to the end of a shaft 350 supported in suitable bearings (not shown) in a bracket 352 fixed to the simulated vehicle body 222. Also rotatably journalled in bracket 352 by suitable bearings (not shown) parallel to shaft 350 is a similar shaft 354. Fixed to the end of shaft 354 is a crank 356 connected by a pivot member 357 to rod 358. Rod 358 is connected to the free end of crank 340 in the same manner that rod 344 is connected to crank 338. Thus, manipulation of gear lever 204 is effective to rotate shaft 354 if the gear actuator control rod is connected to crank 340 and, alternatively, shaft 350 if the gear-actuator control rod is connected to crank 338. On the ends opposite cranks 348 and 356, shafts 350 and 354 mount cams 360 and 362. Cams 360 and 362 are constrained for simultaneous movement by a double-ended cam follower 364 reciprocably mounted in a support 366 fastened to the simulator vehicle body 222. Simultaneous movement of cams 360 and 362 is necessary since, as will become apparent presently, each of these cams is operably connected to one of the two segments of manual gear switch S10, and since the switch arms of both switch segments must be moved for each simulated shifting of gears. And, it will be recalled, these shafts are operably connected to gear lever 204 by cranks 338 and 340 and only one of these cranks is operably connected to gearshift lever 204 at any given time. Therefore, the cooperation of cams 360 and 362 together with cam follower 364 is effective to convert pivotal movement of one of the two shafts 350 or 354 into pivotal movement of both cams 360 and 362.

Only the switch arms A of the two segments of manual gear switch S10 are shown in FIGURE 8. These switch arms are fixed to shafts 368 and 370 which are rotatably mounted in suitable bearings (not shown) in bracelets 372 and 374 mounted on the simulated vehicle body 222. Fixed to the ends of shafts 368 and 370 opposite switch arms A are cranks 376 and 378. Crank 376 is connected to the periphery of cam 360 by a connecting link 380 pivoted as at 382 to the free end of crank 376 and at 384 adjacent the periphery of the cam. Crank 378 is similarily connected adjacent the periphery of cam 362 by a conecting link 386 pivoted as at 388 to the free end of the crank and at 390 adjacent the periphery of the cam. Thus, the simultaneous rotation of cams 360 and 362 is effective to simultaneously pivot shafts 368 and 370 to transfer gear switch S10 switch arms A from one to another of the gear switch contacts.

Bracket 352 and the components mounted on it form a gearshift unit which may be readily assembled in simulated vehicle 200 by bolting bracket 352 to vehicle body 222 and fixing rods 344 and 358 to cranks 348 and 356 with pivoted members 346 and 357. As is shown in FIGURE 12B, all of the electrical connections to segments A and B of manual gear switch S10 are made through plug-jack connector P1–J1. Jack J1 is mounted on the junction panel in the vehicle body and plug P1 incorporated in the gearshift unit. After the gearshift unit is bolted in place, all necessary electrical connections are completed simultaneously by plugging plug P1 into jack J1.

As was pointed out above, under the sub-heading GENERAL, the simulated vehicle 200 is provided with conventional left and right indicator signals I5 and I4 mounted on simulated vehicle instrument panel 212. Signal indicators I5 and I4 are activated by a signal indicator switch S15 (see FIGURE 11A) the actuator 394 of which is mounted on steering column 226 in the conventional manner (see FIGURE 2).

Automatic gear switch S12 (FIGURES 11A and 12C) is actuated, through any suitable linkage, by conventional push buttons (not shown) in the cluster 213 on simulated vehicle instrument panel 212. When simulated vehicle 200 is programed for automatic transmission simulation, automatic gear switch S12 selectively activates circuits in the speedometer circuitry to properly correlate the operator's manipulations of accelerator pedal 206 and the speed indication provided by speedometer M1 and reproduced in the speed column of strip chart 616 as the simulator operator selects different gear ranges. All of the electrical connections to automatic gear switch S12 are made through plug-jack connector P8–J8. Jack J8 is located on the junction panel in vehicle body 222 and plug P8 is physically attached to switch S12 by the leads shown in FIGURE 12C. After switch S12 is installed, the electrical connections to it are quickly made by plugging plug P8 into jack J8.

In addition to facilitating assembly of the simulated vehicle, the extensive use of unitized sub-systems in simulated vehicle 200 simplifies vehicle maintenance since a defective sub-assembly may be quickly removed and replaced. The interior of the vehicle body, in which these sub-assemblies and the junction panel are mounted, is readily reached by lifting a hood 396 pivotally fixed to the vehicle body 222. In the raised position (not shown) a hood switch S18 (see FIGURE 12C) is opened, interrupting the circuit to accelerator autotransformer T2 and thereby preventing the application of operating voltage to projector 400.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle operation simulator:
(a) means including a moving film, a screen, and means comprising a single projector having a projector lamp for projecting the image of said film on said screen for presenting a varying road scene to the operator of said simulator;
(b) a control to be actuated by said operator in response to a stimulus presented by said scene;
(c) means for projecting a vivid burst of color on said screen if said operator fails to properly manipulate said control;
(d) means for momentarily extinguishing said projection lamp if said operator properly manipulates said control;
(e) circuit means activatable in a first condition to initiate operation of said color burst projecting means and in a second condition to initiate operation of said projection lamp extinguishing means;
(f) means including means incorporated in said film for activating said circut means; and
(g) means operatively connected to said control for operating said circuit to said first condition if said operator fails to properly manipulate said control in response to said stimulus.

2. In a simulated vehicle pivotally mounted on a base for movement about a first axis:
(a) a manipulatable steering element; and
(b) means for generating an electrical manifestation of the manipulation of said steering element from its normal position, the rate of change of magnitude of said electrical manifestation being substantially greater during manipulation of said steering element near its normal position than during manipulation of said steering element more remote from its normal position, said means including:
(c) a variable electrical element mounted on said vehicle and having an input element pivotable about a second axis parallel to said first axis;
(d) a sleeve pivoted on said base about a third axis in spaced parallel relation to said first and second axes, said sleeve having a bore with its axis extending normal to said third axis; and
(e) a rod slidably received in said sleeve bore and fixed to said input element.

3. In a vehicle operation simulator:
(a) means including a single motion picture projector for presenting a varying road scene to the operator of said simulator;
(b) a control to be actuated by said operator in response to a stimulus presented by the scene;
(c) means for replacing said varying scene wtih a shock producing stimulus if said operator fails to properly manipulate said control in response to said stimulus; and
(d) means responsive to the proper manipulation of said control for momentarily extinguishing the projector lamp.

4. In a simulated dirigible vehicle pivotally mounted upon a base:
(a) a manipulatable steering element;
(b) means for generating an electrical manifestation of the manipulation of said steering element from its normal position;
(c) means including a mechanical linkage between the steering element and the base for pivoting the simulated vehicle relative to the base incident to manipulation of the steering element; and
(d) linkage means operably connected between said vehicle and said electrical manifestation generating means for decreasing the rate of change of the magnitude of said electrical manifestation as the deviation of said steering element from its normal position is increased.

5. In a vehicle operation simulator having:
(a) an accelerator positioned for manipulation by the operator of said simulator;
(b) a projector having an alternating current motor for presenting a varying road scene to said operator; and
(c) means operative incident to the manipulation of said accelerator for varying the projection rate of said projector; the improvement wherein said projection rate varying means includes:
(d) a power supply for said projector motor comprising an autotransformer having its output operatively connected to said motor;
(e) first means operatively connected to said accelerator for varying the output voltage of said autotransformer in response to manipulations of said accelerator;
(f) second means for generating a second variable voltage suitable for actuating a speed indicator; and
(g) means for drive connecting said second means and said first means to maintain constant the ratio between the outputs of said autotransformer and said second means; whereby the outputs of said autotransformer and said second generator means are correlated for all positions of said accelerator.

6. The vehicle operation simulator defined in claim 5, including:
(a) a rotatable shaft;
(b) a contact arm fixed to said shaft for varying said autotransformer output voltage;
(c) an operating member fixed to said shaft; and
(d) a rigid link pivoted to said operating member and said accelerator, said accelerator being mounted for pivotal movement about an axis parallel to axis of rotation of said shaft.

7. The vehicle operation simulator defined in claim 6 including:
(a) a first gear fixed to said shaft;
(b) a second gear meshed with said first gear;
(c) voltage responsive means for recording a simulated vehicle speed commensurate with the manipulation of said accelerator;
(d) a potentiometer including a pivotable voltage adjusting member for varying the voltage to said recording means; and (e) a rotatable shaft fixed to said second gear and the slide of said potentiometer.

8. In a vehicle operation simulator having means for presenting a varying road scene to the operator of said simulator including a projector having a projection lamp and a film having thereon the scene to be presented following by a sequence projectable to display a vivid burst of color to the simulator operator and a control to be manipulated by said operator in response to a stimulus presented by said road scene:

(a) circuit means including means connecting said projection lamp to a power source;

(b) means in said scene presenting means for conditioning said circuit means to one of a plurality of conditions corresponding to the proper control manipulation response to said stimulus;

(c) means responsive to proper manipulation of said control for activating said circuit means to a condition effective to extinguish said projection lamp to end presentation of said scene; and (d) means responsive to improper manipulation of said control for activating said circuit means to a condition in which the circuit between the power source and the projection lamp is maintained uninterrupted, whereby said scene presenting means causes a vivid burst of color to be displayed to said operator.

9. The vehicle operation simulator defined in claim 8, wherein:

(a) said scene presenting means includes a moving film; and (b) said circuit conditioning means includes a stepping switch and means including mechanically actuated switching means actuated by said film for advancing the contactor of said switch to a predetermined contact coincidental with the presentation of a particular stimulus.

10. The vehicle operation simulator defined in claim 9, wherein said circuit conditioning means further includes a multiple contact switching device and programing means interposed between said stepping switch and said switching device, said programing means being selectively interchangeable to permit different ones of said switching device contacts to be operatively connected to each of said stepping switch contacts.

11. In a vehicle operation simulator having means for presenting a varying road scene to the simulator operator, means for recording the responses of said operator to stimuli presented by said scene, and circuit means for supplying operating voltages to said scene presenting means and said recording means:

(a) a gear shift lever manipulatable by said operator to simulate the operation of a manual transmission;

(b) a clutch pedal;

(c) means for interrupting said circuit means if manipulation of said gear shift lever is not accompanied by depression of said clutch pedal; and (d) means independent of said gear shift lever and manipulatable by the operator to simulate the operation of an automatic transmission; and (e) selectively operable switch means movable from a first to a second position to deactivate said circuit interrupting means and prevent manipulation of said automatic transmission simulating means without depression of said clutch from interrupting the circuit means supplying operating voltage to said scene preventing means and said recording means.

12. The vehicle operation simulator defined in claim 11, wherein said circuit means includes:

(a) at least one multiple contact rotary switch having a contactor operatively connected to said gear shift lever, whereby manipulation of said gear shift lever causes said contactor to transfer from one to another of the rotary switch contacts; and (b) a biased open switch connected with parallel to said rotary switch between the source of operating voltage and the scene presenting and recording means, said switch being closed by depression of said clutch pedal to prevent circuit interruption during movement of said rotary switch contactor.

13. In a vehicle operation simulator having means for presenting a varying road scene to the simulator operator, means for recording the responses of said operator to stimuli presented by said scene, and circuit means for supplying operating voltages to said scene presenting means and said recording means:

(a) a gear shift lever manipulatable by said operator to simulate the operation of a manual transmission;

(b) a clutch pedal; and (c) means for interrupting said circuit means if manipulation of said gear shift lever is not accompanied by depression of said clutch pedal, said circuit means including:

(d) at least one multiple contact rotary switch having a contactor operatively connected to said gear shift lever, whereby manipulation of said gear shift lever causes said contactor to transfer from one to another of the rotary switch contacts; and (e) a biased open switch connected in parallel to said rotary switch, said switch being closed by depression of said clutch pedal to prevent circuit interruption during movement of said rotary switch contactor, said clutch pedal being fixed to a pivoted lever and including means for closing said switch comprising:

(f) a flexible actuator fixed to said switch;

(g) a reciprocable rod pivoted to said lever;

(h) an arm fixed to said reciprocable rod;

(i) an enlarged diameter member fixed to said arm and engaging said actuator, depression of said clutch moving said actuator to close said switch contacts; and (j) means biasing said clutch pedal to an inoperative position.

14. In a vehicle operation simulator having means for presenting a varying road scene to the simulator operator, means for recording the responses of said operator to stimuli presented by said scene, and circuit means for supplying operating voltages to said scene presenting means and said recording means:

(a) a gear shift lever fixed to a rotatable shaft and manipulatable by said operator to simulate the operation of a manual transmission;

(b) a clutch pedal;

(c) means for interrupting said circuit means if manipulation of said gear shift lever is not accompanied by depression of said clutch pedal, said circuit means including:

(d) at least one multiple contact rotary switch having a contactor operatively connected to said gear shift lever, whereby manipulation of said gear shift lever causes said contactor to transfer from one to another of the rotary switch contacts;

(e) a biased open switch connected in parallel to said rotary switch, said switch being closed by depression of said clutch pedal to prevent circuit interruption during movement of said rotary switch contactor;

(f) two rotary switches having rotatable switch arms; and (g) a linkage interposed between said gear shift lever and said rotary switch shaft, comprising:

(i) a pair of disc-type cams fixed on spaced, parallel, rotatable shafts;

(ii) a reciprocable cam follower between said cams;

(iii) a crank fixed to each of said rotatable shafts;

(iv) a pair of connecting links, one of said links being pivoted to each crank and the associated cam; and (v) means for rotating said cam shafts including means for converting rotary movements of said gear shift lever mounting shaft to rotary movement of said cam shafts.

15. In a vehicle operation simulator:

(a) projector means for presenting a sequence of road scenes to the operator of said simulator;
(b) control means to be manipulated by said operator in response to stimuli presented by said road scenes;
(c) means for recording the control manipulation responses of said operator to said stimuli;
(d) power supply means;
(e) circuit means for connecting the power supply means to the projector means, the control means, and the recording means;
(f) switching means comprising a single switch means in said circuit means effective when energized to complete said circuit means and supply power to the projector means, the control means, and the recording means and effective upon deenergization subsequent to completion of said circuit means to interrupt the continuity of said circuit means and interrupt the supply of power to said projector means, said control means, and said recording means; and
(g) manually activatable hold means in said circuit means operable to interrupt the supply of operating voltage to and therefore the operation of said projector means and said recording means for periods of varying duration without deenergizing said switching means to thereby permit test resumption without loss of recording continuity and without re-running an already displayed portion of the sequence of road scenes.

16. The vehicle operation simulator as defined in claim 15, wherein said control means include a simulated ignition switch and operation of said projector is initiated by closing the ignition switch.

17. In combination in a vehicle operation simulator comprising a simulated vehicle and means including a projector for presenting a scene to the simulator operator:

(a) a unitized simulated braking system, comprising:
  (i) a pivoted brake pedal to be manipulated by the simulator operator;
  (ii) a rotary switch; and
  (iii) connecting means between said brake pedal and the contactor of said switch including:
    (a) an elongated rod pivoted at one end to said pedal;
    (b) a rotatable shaft supporting said contactor;
    (c) a slotted member fixed to and extending normally from said rotatable shaft;
    (d) an arm fixed to said elongated rod and extending into the slot in said member; and
    (e) resilient biasing means resisting movement of said pedal from its normal position; and
(b) means including the contactor of said switch for controlling the operation of said projector.

18. The vehicle operation simulator of claim 17, together with:

(a) means for recording the operator's vehicle control manipulation response;
(b) a potentiometer having a rotatable shaft and a slide fixed to the shaft;
(c) means for transmitting brake pedal movement from the rotary switch to the potentiometer comprising:
  (i) a first gear fixed to the rotatable shaft supporting the rotary switch; and
  (ii) a second gear fixed to the potentiometer shaft and meshed with the first gear; and
(d) means electrically connecting the slide of the potentiometer to the recording means.

19. In combination:

(a) a seat mounted for pivotal movement about a vertical axis;

(b) steering means positioned for manipulation by a person in said seat;
(c) a screen disposed in a position to be viewed by a person in said seat;
(d) a projector for displaying a scene upon said screen; and
(e) means operative incident to the manipulation of said steering means for moving said seat with respect to said screen and for limiting said movement to a single plane, said last-named means including:
(f) an arcuate track coaxial with said seat pivot axis;
(g) a member in rolling engagement with said track, said member being rotatable about an axis fixed with respect to said seat; and
(h) means drive-connecting said member and said steering means to produce rolling of said member along said track incident to manipulation of said steering means to thereby pivot said seat about said seat pivot axis.

20. The combination defined in claim 19, wherein said steering means includes a steering wheel and said connecting means includes a rotatable shaft, said shaft, said rotatable member and said steering wheel having a common axis of rotation intersecting said seat pivot axis.

21. In a vehicle operation simulator having means including a moving film projector for presenting a varying road scene to the operator of said simulator and at least one control to be actuated by said operator in response to a stimulus presented by said scene:

(a) a recorder having two predetermined rates of operation; and
(b) means activated by the movement of film through said projector for expanding the time base of the record produced by said recorder during presentation of said stimulus and for contracting the time base of such record after completion of the presentation of said stimulus and for contracting the time base of such record after completion of the presentation of said stimulus, said last-named means including means for changing the rate of operation of said recorder for the duration of the presentation of said stimulus from one of said predetermined rates to the second of said predetermined rates,
(c) said film movement activated means including switching means movable between open and closed positions, a relay energized and deenergized by the closing of said switching means and first and second circuit means completed by the energization and deenergization of relay for increasing and decreasing the voltage applied across and the speed of said motor; and
(d) said film comprising means for effecting movement of said switching means between its closed and opened positions.

References Cited by the Examiner

UNITED STATES PATENTS

| | | | |
|---|---|---|---|
| 1,921,494 | 8/1933 | Wildhaber | 352—21 |
| 2,259,139 | 10/1941 | Oesinghaus | 346—136 |
| 2,275,246 | 3/1942 | Caldwell | 346—136 |
| 2,374,401 | 4/1945 | White | 35—12 |
| 2,687,580 | 8/1954 | Dehmel | 35—12 |
| 2,700,227 | 1/1955 | Arkell et al. | 35—11 |
| 2,715,783 | 8/1955 | Chedister | 35—11 |
| 2,742,714 | 4/1956 | Allgaier | 35—11 |
| 2,870,548 | 1/1959 | Chedister | 35—11 |
| 2,894,077 | 7/1959 | McCoy | 179—171 |
| 2,932,235 | 4/1960 | Ochiai | 352—16 |
| 2,985,053 | 5/1961 | Heffelfinger | 346—72 |
| 3,015,169 | 1/1962 | Chedister | 35—11 |
| 3,071,874 | 1/1963 | Chedister | 35—11 |
| 3,113,248 | 12/1963 | Friedman | 317—101 |

JEROME SCHNALL, *Primary Examiner.*

LEO SMILOW, LAWRENCE CHARLES, *Examiners.*